United States Patent [19]

Yamane et al.

[11] Patent Number: 5,784,509
[45] Date of Patent: Jul. 21, 1998

[54] WAVEGUIDE-OPTICAL FIBER CONNECTION STRUCTURE AND WAVEGUIDE-OPTICAL FIBER CONNECTION METHOD

[75] Inventors: Takashi Yamane; Yasuhiko Omori, both of Kawasaki; Shinya Sawae, Sapporo; Yasutoshi Furukawa; Hironao Hakogi, both of Kawasaki, all of Japan

[73] Assignee: Fujitsu Limited, Kanagawa, Japan

[21] Appl. No.: 649,313

[22] Filed: May 17, 1996

Related U.S. Application Data

[62] Division of Ser. No. 332,578, Oct. 31, 1994, Pat. No. 5,557,695.

[30] Foreign Application Priority Data

May 12, 1994 [JP] Japan ............................. 6-098840
Sep. 8, 1994 [JP] Japan ............................. 6-215075

[51] Int. Cl.[6] ......................................... G02B 6/36
[52] U.S. Cl. ............................... 385/49; 385/33; 385/35; 385/43; 385/83
[58] Field of Search .......................... 385/14, 49, 65, 385/83, 88, 89, 147

[56] References Cited

U.S. PATENT DOCUMENTS

| | | | |
|---|---|---|---|
| 4,466,696 | 8/1984 | Carney | 385/49 |
| 4,796,975 | 1/1989 | Lukas et al. | 385/49 |
| 5,080,458 | 1/1992 | Hockaday | 385/49 |
| 5,175,781 | 12/1992 | Hockaday et al. | 385/49 |
| 5,282,071 | 1/1994 | Hartman et al. | 385/49 |
| 5,479,547 | 12/1995 | Kunikane et al. | 385/49 |

FOREIGN PATENT DOCUMENTS

| | | | |
|---|---|---|---|
| 0560043 | 9/1993 | European Pat. Off. | |
| 0589268 | 3/1994 | European Pat. Off. | |
| 4217553 | 12/1993 | Germany | |
| 63-144310 | 6/1988 | Japan | |
| 14710 | 1/1989 | Japan | |
| 1-183604 | 7/1989 | Japan | 385/49 |
| 2125209 | 5/1990 | Japan | |
| 5257019 | 10/1993 | Japan | |
| 6027333 | 2/1994 | Japan | |

*Primary Examiner*—John Ngo
*Attorney, Agent, or Firm*—Helfgott & Karas, P.C.

[57] ABSTRACT

The invention provides an improved simplified waveguide-optical fiber connection structure for connecting a waveguide and an optical fiber. The waveguide-optical fiber connection structure comprises an optical fiber, a waveguide substrate having a waveguide integrally formed thereon and having a first guide groove formed thereon adjacent an end portion of the waveguide for positioning the optical fiber therein, and a fiber substrate provided in an opposing relationship to the first guide groove for cooperating with the first guide groove to hold the optical fiber thereon. The waveguide-optical fiber connection structure can be applied to a waveguide circuit which is employed for optical communication, optical information management and so forth.

13 Claims, 37 Drawing Sheets

F I G. 29
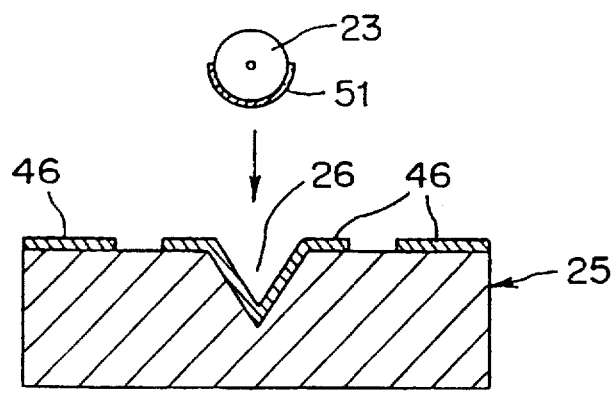
F I G. 30
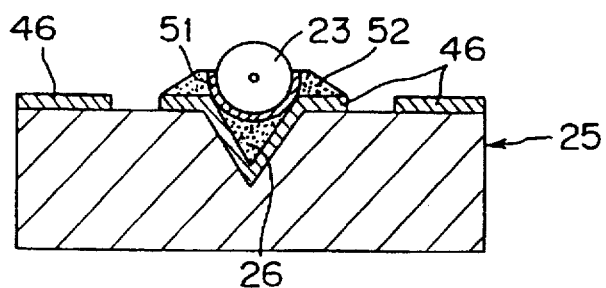
F I G. 31
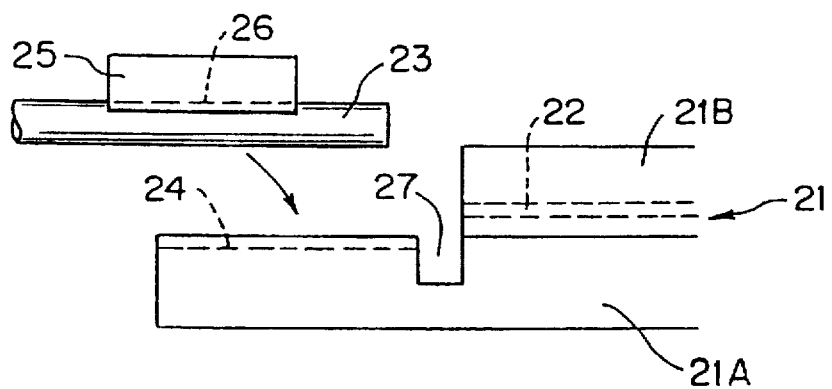

F I G. 67
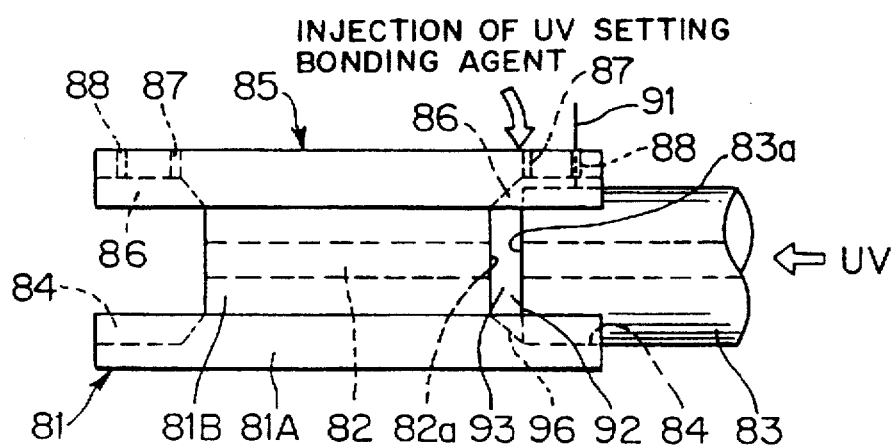
F I G. 68
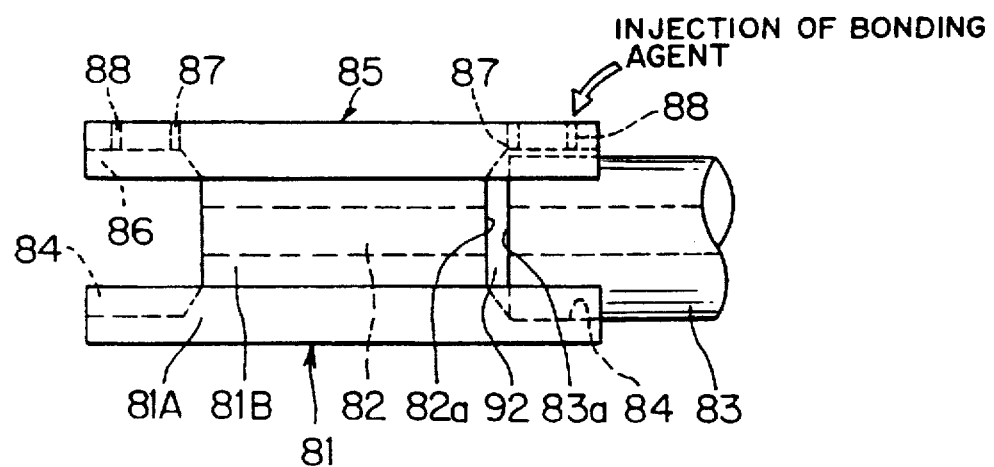

WAVEGUIDE-OPTICAL FIBER CONNECTION STRUCTURE AND WAVEGUIDE-OPTICAL FIBER CONNECTION METHOD

This is a division of application Ser. No. 08/332,578, filed Oct. 31, 1994 and now U.S. Pat. No. 5,557,095.

BACKGROUND OF THE INVENTION

1) Field of the Invention

This invention relates generally to a waveguide circuit for use for optical communication, optical information management and so forth, and more particularly to a structure for and a method of connecting a waveguide and an optical fiber formed on a waveguide substrate to each other, a waveguide substrate for use for such connection and a method of producing the waveguide substrate as well as an optical fiber with a fiber substrate for use for such connection.

2) Description of the Related Art

In recent years, introduction of optical subscriber systems has been and is being promoted, and it is a subject to be solved to minimize and reduce the costs of optical components of optical subscriber systems. Optical parts employing a waveguide are suitable for mass production by batch processing and for minimization and high integration and are considered promising. However, several technical subjects to be solved still remain.

Above all, the technique of connecting a waveguide formed on a waveguide chip (waveguide substrate) to an optical fiber is essential for reduction in cost, and connection means which are stable in property and suitable for mass production and can be supplied at a low cost have been developed actively in recent years.

For example, such means as shown in FIGS. 71(a) and 71(b) or 72(a) and 72(b) is popularly employed as such connection means.

According to the means shown in FIGS. 71(a) and 71(b), in order to connect a waveguide 2 formed on a waveguide chip (waveguide substrate) 1 and an optical fiber 3 to each other, an end face 2a of the waveguide 2 is first formed into a mirror face by a suitable technique such as polishing and then an alignment operation to adjust the position (X-axis direction, Y-axis direction and Z-axis (optic axis) direction) and the angle ($\theta$, $\phi$) of the optical fiber 3 with respect to the waveguide 2 as seen in FIG. 71(a) is performed to establish a particular positional parallel relationship of the optical fiber 3 to the waveguide 2, and then the waveguide 2 (waveguicle chip 1) and the optical fiber 3 are coupled directly to each other as shown in FIG. 71(b) by adhesion, fusion connection or some other suitable connection technique.

On the other hand, according to the means shown in FIGS. 72(a) and 72(b), a lens 4 is interposed between a waveguide 2 and an optical fiber 3 as shown in FIG. 72(a), and after the position and the angle of the optical fiber 3 with respect to the waveguide 2 are adjusted similarly as in the means shown in FIGS. 71(a) and 71(b), the waveguicle 2 (waveguide chip 1), the lens 4 and the optical fiber 3 are connected and secured to each other as shown in FIG. 72(b) by welding or some other suitable technique. Consequently, light is communicated between the waveguide 2 and the optical fiber 3 by way of the lens 4.

However, both of the connection means described above with reference to FIGS. 71(a), 71(b) and 72(a), 72(b) require adjustment in position at least between the optical fiber 3 and the waveguide 2 (in the means shown in FIGS. 72(a) and 72(b), also the position of the lens 4 must be adjusted), and such adjustment requires a somewhat high skill and much time. Accordingly, reduction in cost by mass production is difficult with any of the connection means.

Different connection means between a waveguide and an optical fiber are proposed, for example, in Japanese Patent Laid-Open Application No. Showa 64-4710, Japanese Patent Laid-Open Application No. Heisei 2-125209 and Japanese Patent Laid-Open Application No. Heisei 5-257019.

According to the waveguide-optical fiber connection method disclosed in Japanese Patent Laid-Open Application No. Showa 64-4710, a waveguide circuit including a ridge type waveguide and several stopper portions is formed on a circuit board. Meanwhile, a connection jig is prepared which is so constructed that a bottom face thereof closely contacts with a concave surface of the waveguide circuit and an outer wall thereof closely contacts with a side wall of at least one of the stopper portions of the waveguide circuit and which has a guide groove formed thereon so as to make the center of the core of the ridge type waveguide and the center of the core of an optical fiber coincide with each other. The connection jig is fixed to the waveguide circuit with the outer wall thereof closely contacted with the side wall of the stopper portion, and an optical fiber is inserted into the guide groove of the thus fixed connection jig, whereafter the optical fiber thus inserted is fixed to the connection jig to connect the waveguide and the optical fiber to each other.

With the waveguide-optical fiber connection method, however, a stopper portion of a complicated configuration must be formed on a substrate, and this makes a factor which makes an obstacle to reduction in cost by mass production. Further, since an optical fiber is not particularly supported, when it is inserted into the guide groove of the connection jig to fix the optical fiber, on the side thereof remote from the connection jig, the optical fiber and the waveguide cannot be fixed with the core of the waveguide and the core of the optical fiber aligned accurately with each other.

Meanwhile, according to the waveguide-optical fiber coupling structure disclosed in Japanese Patent Laid-Opeii Application No. Heisei 2-125209, a waveguide base member has guide grooves formed in a parallel, predetermined spaced relationship from each other therein and has a waveguide formed thereon. The waveguide has an entrance/exit for an optical signal at an end face of the waveguide base member. An optical fiber holding connector member has a guide pin for engaging with the guide groove, and holds an optical fiber positioned such that, when the guide pin is engaged with the guide groove, the optical fiber is optically coupled to the entrance/exit of the waveguide.

With the waveguide-optical fiber coupling structure, however, in addition to the guide groove for fixing an optical fiber, another guide groove is formed in the waveguide base in order to position an optical fiber with respect to the waveguide, and a guide pin for engaging with the additional guide groove must be provided on the optical fiber holding connector member, which makes the waveguide-optical fiber coupling structure complicated.

Further, according to the waveguide apparatus and a process of producing the waveguide apparatus disclosed in Japanese Patent Laid-Open Application No. Heisei 5-257019, a waveguide portion formed on a Si substrate is exposed to an end face of the waveguide apparatus, and a pair of V-shaped grooves each having a V-shaped cross section are formed on the waveguide apparatus. Another pair of V-shaped grooves are formed on a connector, and a pair of guide pins are threaded from the V-shaped grooves of the waveguide apparatus to the V-shaped grooves of the connector so that the waveguide apparatus and the connector are mechanically pressed against each other by way of the guide pins to couple the end face of the waveguide of the waveguide apparatus and the end face of an optical fiber of the connector to each other while aligning the optic axes of the waveguide apparatus and the connector with each other.

Also with the waveguide apparatus and the producing process for the waveguide apparatus, however, in order to position the optical fiber with respect to the waveguide, additional V-shaped grooves must be formed on both of the waveguide apparatus and the connector and guide pins for engaging with the V-shaped grooves must be provided, which makes the waveguide apparatus complicated.

Further, with the connection means disclosed in Japanese Patent Laid-Open Application No. Heisei 2-125209 and Japanese Patent Laid-Open Application No. Heisei 5-257019 mentioned above, the production accuracy of the guide pins and the positioning accuracy between the guide pins and the optical fiber must be high, and it is very difficult to produce the connection portions. Further, as the number of elements increases, the number of steps required for assembly increases, and this makes a factor which makes an obstacle to the mass production and the reduction in cost.

Further, in the techniques described above, in order to position the optical fiber in the direction of its optic axis (Z-axis direction in FIGS. 71(a), 71(b) and 72(a), 72(b)), the optical fiber is moved in a direction of its optic axis until an end face of the optical fiber is abutted with an end face of the waveguide. With the positioning method, however, depending upon the magnitude of the force acting upon the optical fiber to move the optical fiber in the direction of its optic axis, the end face of the optical fiber or the waveguide may be damaged or, as the action of the force continues, the optical fiber may be curved to increase the loss of an optical signal transmitted along the optical fiber. Further, if the optical fiber cannot be moved to an optimum position with respect to the waveguide, then this also makes a factor of increasing the loss of such optical signal.

SUMMARY OF THE INVENTION

It is an object of the present invention to provide a waveguide-optical fiber connection structure and method by which connection and fixation between a waveguide and an optical fiber can be performed readily with a simple structure to allow mass production and reduction in production cost of waveguide circuits and a waveguide substrate for use for such connection and a producing method for the waveguide substrate as well as an optical fiber with a fiber substrate for use with the connection.

It is another object of the present invention to provide a waveguide-optical fiber connection structure and method by which connection and fixation between a waveguide and an optical fiber can be performed with a high degree of accuracy so that an optical signal can be transmitted with a low loss between them and a waveguide substrate for use for such connection and a producing method for the waveguide substrate as well as an optical fiber with a fiber substrate for use with the connection.

In order to attain the objects described above, according to an aspect of the present invention, there is provided a waveguide-optical fiber connection structure, which comprises an optical fiber, a waveguide substrate having a waveguide integrally formed thereon, the waveguide substrate having a first guide groove formed thereon adjacent an end portion of the waveguide for positioning the optical fiber therein, and a fiber substrate provided in an opposing relationship to the first guide groove for cooperating with the first guide groove to hold the optical fiber thereon.

With the waveguide-optical fiber connection structure, the waveguide is integrally formed on the waveguide substrate, and the first guide groove for positioning the optical fiber is formed on an extension line of an optic axis of the waveguide on the waveguide substrate and the first guide groove and the fiber substrate cooperate to hold the optical fiber. Consequently, the position of the optical fiber with respect to the waveguide can be determined without any adjustment, and the end portion of the waveguide and an end portion of the optical fiber can be connected to each other readily with a high degree of accuracy and with a high degree of reliability with a simple structure such that an optical signal can be communicated at a low loss between them. Accordingly, there is an advantage in that mass production and reduction in cost of waveguide circuits can be realized.

According to another aspect of the present invention, there is provided a waveguide-optical fiber connection structure, which comprises an optical fiber, a waveguide substrate having a waveguide integrally formed thereon, the waveguide substrate having a first guide groove formed thereon adjacent an end portion of the waveguide for positioning the optical fiber therein, and a fiber substrate for holding the optical fiber thereon, a face portion of the waveguide substrate and an opposing face portion of the fiber substrate being fixed to each other in a condition wherein the optical fiber fixed to the fiber substrate is held in close contact with the first guide groove on the waveguide substrate.

According to a further aspect of the present invention, there is provided a waveguide-optical fiber connection structure, which comprises an optical fiber, a waveguide substrate having a waveguide integrally formed thereon, the waveguide substrate having a first guide groove formed thereon adjacent an end portion of the waveguide for positioning the optical fiber therein, and a fiber substrate having an optical fiber fixing second guide groove formed thereon and coated with a metal film, the fiber substrate having a solder supply groove formed thereon and communicating with the second guide groove for flowing therethrough solder to be used for metal fixation of the fiber substrate to the optical fiber, the optical fiber having a metal coating applied to an area of an outer periphery of a clad thereof necessary for metal fixation to the second guide groove, the optical fiber being fixed to the fiber substrate by metal fixation which is achieved by flowing solder in through the solder supply groove while the optical fiber is mounted in the second guide groove, each of a face portion of the fiber substrate and a face portion of the waveguide substrate which are opposed to each other when the optical fiber fixed to the fiber substrate by metal fixation is closely contacted with the first guide groove of the waveguide substrate having a metal film formed thereon, the waveguide and the optical fiber being connected to each other by metal fixation between the metal films on the face portion of the waveguide substrate and the face portion of the fiber substrate opposing to the face portion of the waveguide substrate while the optical fiber fixed to the fiber substrate is held in close contact with the first guide groove on the waveguide substrate.

According to a still further aspect of the present invention, there is provided a waveguide-optical fiber connection method for connecting an end portion of an optical fiber to an end portion of a waveguide, which comprises the steps of preparing a waveguide substrate having a waveguide integrally formed thereon and having a first guide groove formed thereon adjacent an end portion of the waveguide for positioning the optical fiber therein and a fiber substrate for holding the optical fiber thereon, and fixing a face portion of the waveguide substrate and an opposing face portion of the fiber substrate to each other in a condition wherein the optical fiber fixed to the fiber substrate is held in close contact with the first guide groove on the waveguide substrate.

With the waveguide-optical fiber connection structures and method described above, the position of the optical fiber with respect to the waveguide can be determined without any adjustment, and the end portion of the waveguide and the end portion of the optical fiber can be connected to each other readily with a high degree of accuracy and with a high degree of reliability with a simple structure such that an optical signal can be communicated at a low loss between them. Consequently, there is an advantage in that mass production and reduction in cost of waveguide circuits can be realized.

According to a yet further aspect of the present invention, there is provided a waveguide substrate for use for waveguide-optical fiber connection, which comprises a substrate having a waveguide integrally formed thereon and having a first guide groove formed adjacent an end portion of the waveguide thereon for positioning an optical fiber, the waveguide and the first guide groove being formed using a single mask member having patterns for formation of a waveguide and a guide groove.

Where the waveguide substrate is employed, the waveguide and the optical fiber can be connected and fixed to each other readily with a high degree of accuracy and with a high degree of reliability with a simple structure such that an optical signal can be communicated at a low loss between them, and mass production and reduction in cost of waveguide circuits can be realized.

According to a yet further aspect of the present invention, there is provided a method of producing a waveguide substrate for use for waveguide-optical fiber connection, which comprises the steps of forming a low refraction index layer and a high refraction index layer on a silicon substrate, partially removing the high refraction index layer using a single mask member having patterns for formation of a waveguide and a guide way to form etching areas for a waveguide and a guide groove, and forming an upper low refraction index layer while the mask member on the opposite sides of the etching area for a guide groove is left as a fiber positioning etching mask, forming a guide groove and finally removing the etching mask.

With the method of producing a waveguide substrate, a waveguide substrate can be produced very readily.

According to a yet further aspect of the present invention, there is provided an optical fiber with a fiber substrate for use for waveguide-optical fiber connection, which comprises an optical fiber having, at an end portion thereof, a metal coating provided on an outer periphery of a clad thereof, and a fiber substrate having a second guide groove for fixation of an optical fiber formed thereon and coated with a metal film, the end portion of the optical fiber being fixed by metal fixation to the second guide groove of the fiber substrate.

Where the optical fiber with a fiber substrate is employed, the waveguide and the optical fiber can be connected and fixed to each other readily with a high degree of accuracy and with a high degree of reliability with a simple structure such that an optical signal can be communicated at a low loss between them, and mass production and reduction in cost of waveguide circuits can be realized.

According to a yet further aspect of the present invention, there is provided a waveguide-optical fiber connection structure, which comprises an optical fiber, a waveguide substrate having a waveguide integrally formed thereon, the waveguide substrate having a first guide groove formed thereon adjacent an end portion of the waveguide for positioning the optical fiber therein, and a fiber substrate having a second guide groove formed therein for positioning the optical fiber, the fiber substrate being fixed to the waveguide substrate with the second guide groove thereof opposed to the first guide groove, the waveguide and the optical fiber being connected to each other by inserting and fixing the optical fiber between the waveguide substrate and the fiber substrate along the first guide groove and the second guide groove.

According to a yet further aspect of the present invention, there is provided a waveguide-optical fiber connection method for connecting an end portion of an optical fiber to an end portion of a waveguide, which comprises the steps of preparing a waveguide substrate having a waveguide integrally formed thereon and having a first guide groove formed thereon adjacent an end portion of the waveguide for positioning the optical fiber therein and a fiber substrate having a second guide groove formed therein for positioning the optical fiber, fixing the fiber substrate to the waveguide substrate with the second guide groove thereof opposed to the first guide groove, and inserting and fixing the optical fiber between the waveguide substrate and the fiber substrate along the first guide groove and the second guide groove.

With the waveguide-optical fiber connection structure and method, the position of the optical fiber with respect to the waveguide can be determined without any adjustment, and the end portion of the waveguide and the end portion of the optical fiber can be connected to each other readily with a high degree of accuracy and with a high degree of reliability with a simple structure such that an optical signal can be communicated at a low loss between them. Consequently, there is an advantage in that mass production and reduction in cost of waveguide circuits can be realized.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIG. 29 is an exploded cross sectional view illustrating the procedure of fixing the optical fiber and the fiber block in the first embodiment;

FIG. 30 is a cross sectional view showing the optical fiber and the fiber block in the first embodiment in the mutually fixed condition;

FIGS. 31 and 32 are an exploded side elevational view and a front elevational sectional view, respectively, illustrating a fixing procedure between the fiber block and the waveguide substrate in the first embodiment;

FIGS. 64 to 68 are side elevational views illustrating different steps of a procedure of connection between the waveguide and the optical fiber in the third embodiment;

DESCRIPTION OF THE PREFERRED EMBODIMENTS a. Aspects of the Invention

Figure 1:
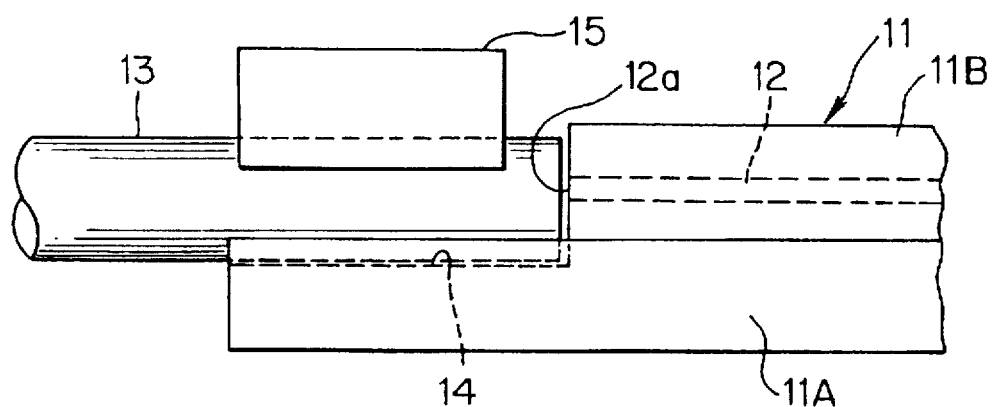
FIGS. 1, 2, 3 and 4 are schematic side elevational views, an exploded perspective view and a front elevational view illustrating different aspects of the present invention.

FIG. 1 shows a side elevational view of a waveguide-optical fiber connection structure and illustrates an aspect of the present invention. Referring to FIG. 1, the waveguide-optical fiber connection structure shown includes a waveguide substrate 11 which In turn includes a substrate portion 11A serving as a substrate body and a waveguide formation layer 11B on which a waveguide (core portion) 12 is formed. The substrate portion 11A has a first guide groove 14 formed thereon adjacent an end portion (end face) 12a of the waveguide 12 for positioning an optical fiber 13 on an extension line of an optic axis of the waveguide 12. The waveguide-optical fiber connection structure further includes a fiber substrate 15 provided in an opposing relationship to the first guide groove 14 for cooperating with the first guide groove 14 to hold the optical fiber 13 thereon.

The waveguide-optical fiber connection structure is advantageous in that the position of the optical fiber 13 with respect to the waveguide 12 can be determined without any adjustment and the end portion 12a of the waveguide 12 and an end portion 13a of the optical fiber 13 can be connected to each other readily with a high degree of accuracy and with a high degree of reliability such that an optical signal can be communicated at a low loss between them, and consequently, mass production and reduction in cost of waveguide circuits can be realized.

Figure 2:
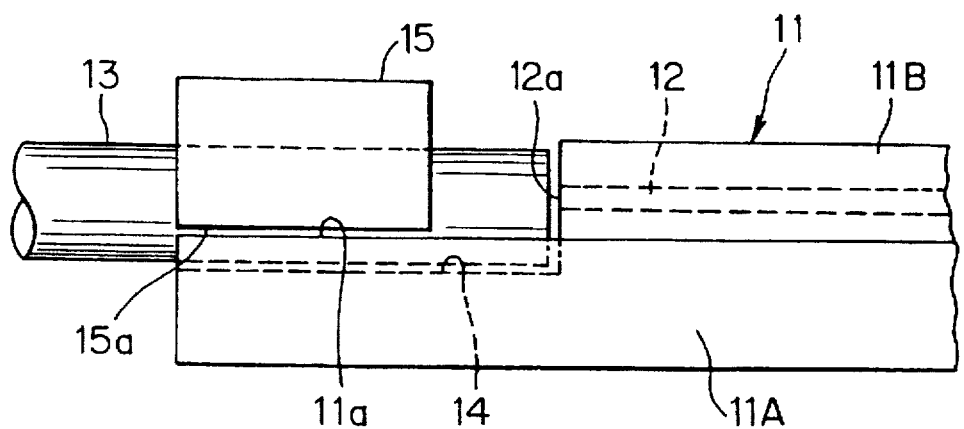

FIG. 2 shows a side elevational view of another waveguide-optical fiber connection structure and illustrates another aspect of the present invention. Referring to FIG. 2, the waveguide-optical fiber connection structure shown includes an optical fiber 13, a waveguide substrate 11 and a fiber substrate 15 which are similar to those described above with reference to FIG. 1. A face portion 11a of the waveguide substrate 11 and an opposing face portion 15a of the fiber substrate 15 are fixed to each other in a condition wherein the optical fiber 13 fixed to the fiber substrate 15 is held in close contact with the first guide groove 14 on the waveguide substrate 11.

Figure 3:
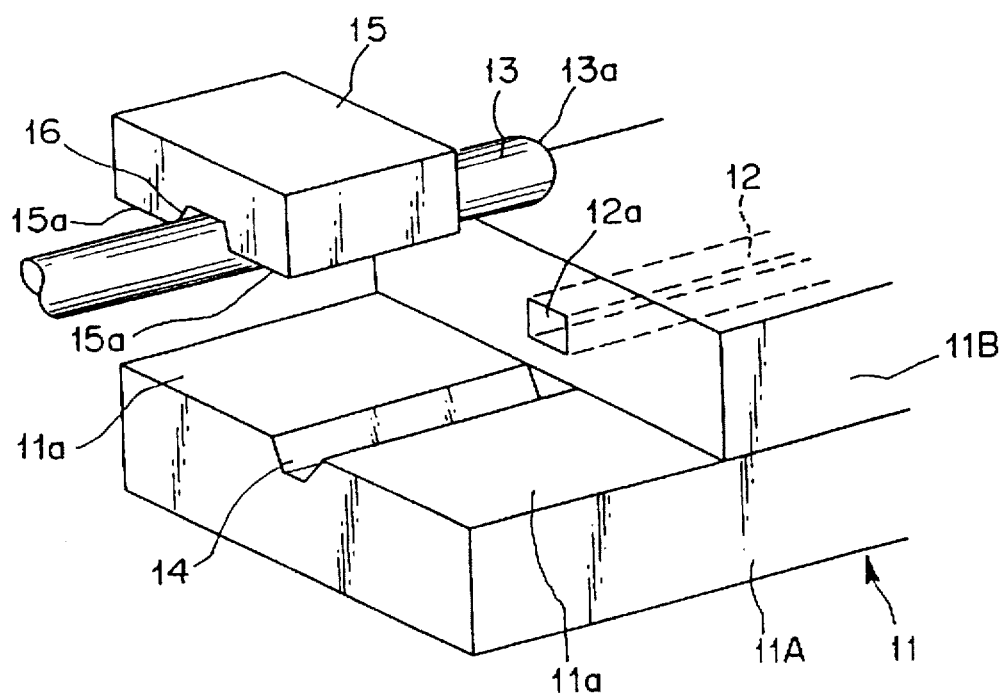

FIG. 3 shows a side elevational view of a further waveguide-optical fiber connection structure and illustrates a further aspect of the present invention. Referring to FIG. 3, the waveguide-optical fiber connection structure shown includes, in addition to an optical fiber 13 and a waveguide substrate 11 similar to those described above with reference to FIG. 1, a fiber substrate 15 having an optical fiber fixing second guide groove 16 formed thereon and coated with a metal film and a solder supply groove formed thereon and communicating with the second guide groove 16 for flowing in theretlirough solder to be used for metal fixation of the fiber substrate 15 to the optical fiber 13. The optical fiber 13 has a metal coating applied only to an area of an outer periphery of the clad thereof necessary for metal fixation to the second guide groove 16, and the optical fiber 13 is fixed to the fiber substrate 15 by metal fixation which is achieved by flowing solder in through the solder supply groove while the optical fiber 13 is mounted in the second guide groove 16.

Each of a face portion 15a of the fiber substrate 15 and a face portion 11a of the waveguide substrate 11 which are opposed to each other when the optical fiber 13 fixed to the fiber substrate 15 by metal fixation is closely contacted with the first guide groove 14 of the waveguide substrate 11 has a metal film formed thereon, and an end portion (end face) 12a of the waveguide 12 and an end portion (end face) 13a of the optical fiber 13 are connected to each other by metal fixation between the metal films on the face portion 11a of the waveguide substrate 11 and the opposing face portion 15a of the fiber substrate 15 while the optical fiber 13 fixed to the fiber substrate 15 is held in close contact with the first guide groove 14 on the waveguide substrate 11.

Here, a method of connecting the waveguide 12 and the optical fiber 13 to each other according to the present invention is described with reference to FIG. 3. According to the waveguide-optical fiber connection method of the present invention, a waveguide substrate 11 having a waveguide 12 and a first guide groove 14 formed thereon is prepared and also a fiber substrate 15 for holding the optical fiber 13 thereon is prepared. Then, a face portion 11a of the waveguide substrate 11 and an opposing face portion 15a of the fiber substrate 15 are fixed to each other in a condition wherein the optical fiber 13 fixed to the fiber substrate 15 is held in close contact with the first guide groove 14 on the waveguide substrate 11, thereby to connect an end portion (end face) 13a of the optical fiber 13 to an end portion (end face) 12a of the waveguide 12.

Also the waveguide-optical fiber connection structures and method described above with reference to FIGS. 2 and 3 are advantageous in that the position of the optical fiber 13 with respect to the waveguide 12 can be determined without any adjustment and the end portion 12a of the waveguide 12 and the end portion 13a of the optical fiber 13 can be connected to each other readily with a high degree of accuracy and with a high degree of reliability such that an optical signal can be communicated at a low loss between them, and consequently, mass production and reduction in cost of waveguide circuits can be realized.

Here, the optical fiber 13 having a metal coating applied to an outer periphery of the clad thereof in advance may be fixed by metal fixation to the second guide groove 16 of the fiber substrate 15 at which the fiber substrate 15 is coated with a metal film to hold the optical fiber 13 on the fiber substrate 15, and in this condition, the waveguide 12 and the optical fiber 13 may be connected to each other using the fiber substrate 15 with the optical fiber 13. In this instance, the optical fiber 13 can be fixed by metal fixation to the second guide groove 16 of the fiber substrate 15 using soldering or the like. Using the thus fixed fiber substrate 15 with the optical fiber 13 (optical fiber with a fiber substrate), the waveguide 12 and the optical fiber 13 can be connected and fixed to each other readily with a high degree of accuracy and with a high degree of reliability with a simple structure such that an optical signal can be communicated at a low loss between them. Thus, there is an advantage in that mass production and reduction in cost of waveguide circuits can be realized.

The waveguide 12 and the optical fiber 13 may be connected to each other using the fiber substrate 15 on which the optical fiber 13 is held by fixing, by metal fixation, to the second guide groove 16 of the fiber substrate 15 the optical fiber 13 having a metal coating applied only to an area of an outer periphery of the clad thereof necessary for metal fixation to the second guide groove 16 while the optical fiber 13 is mounted in the second guide groove 16. In this instance, since the metal coating is not applied to the area in which the outer periphery of the clad of the optical fiber 13 closely contacts with the first guide groove 14 of the waveguide substrate 11, useless metal coating need not be performed, and also precision film thickness control over the overall outer periphery of the clad of the optical fiber 13 is unnecessary.

Further, the optical fiber 13 may be mounted into the second guide groove 16 of the fiber substrate 15 on which a solder supply groove for flowing in therethrough solder to be used for metal fixation to the optical fiber 13 is formed in a communicating relationship with the second guide groove 16, and solder may be flowed in through the solder supply groove to fix the optical fiber 13 to the fiber substrate 15 by metal fixation, and then the waveguide 12 and the optical fiber 13 may be connected to each other using the fiber substrate 15 to which the optical fiber 13 is fixed. In this instance, there is an advantage in that the optical fiber 13 can be fixed very readily to the fiber substrate 15 by metal fixation.

Alternatively, each of the face portion 15a of the fiber substrate 15 and the face portion 11a of the waveguide substrate 11 which are opposed to each other when the optical fiber 13 fixed to the fiber substrate 15 by metal fixation is closely contacted with the first guide groove 14 of the waveguide substrate 11 may have a metal film formed thereon, and the metal films may be fixed to each other by metal fixation to connect the waveguide 12 and the optical fiber 13 to each other. Preferably, a solder material used for the metal fixation between the fiber substrate 15 and the waveguide substrate 11 has a melting point set lower than the melting point of another solder material used for the metal fixation between the fiber substrate 15 and the optical fiber 13.

Where the metal films are provided on the face portion 15a of the fiber substrate 15 and the opposing face portion 11a of the waveguide substrate 11, the waveguide 12 and the optical fiber 13 can be connected to each other by fixing the metal films to each other by metal fixation by soldering, and consequently, the fiber substrate 15 and the waveguide substrate 11 can be connected and fixed to each other readily with certainty.

Further, where the solder material used for the metal fixation between the fiber substrate 15 and the waveguide substrate 11 has a melting point set lower than the melting point of the solder material used for the metal fixation between the fiber substrate 15 and the optical fiber 13, such a situation that the solder material between the fiber substrate 15 and the optical fiber 13 fixed by metal fixation to each other precedently is melted by heat for melting the solder material used for later metal fixation between the fiber substrate 15 and the waveguide substrate 11 so that the metal fixation condition between the fiber substrate 15 and the optical fiber 13 is degraded can be prevented. Consequently, the end portion 12a of the waveguide 12 and the end portion 13a of the optical fiber 13 can be connected to each other with a very high degree of reliability.

Further, the waveguide 12 and the optical fiber 13 may be connected to each other using the waveguide substrate 11 wherein the quartz (SiO$_2$) waveguide 12 and the first guide groove 14 of a V-shaped cross section are formed on a silicon substrate (substrate portion 11A) and the fiber substrate 15 wherein the second guide groove 16 of a V-shaped cross section is formed on the silicon substrate and the optical fiber 13 is held in the second guide groove 16. In this instance, the waveguide 12 and the optical fiber 13 can be connected and fixed to each other readily with a high degree of accuracy and with a high degree of reliability such that an optical signal can be communicated at a low cost between them, and consequently, mass production and reduction in cost of waveguide circuits can be realized. Also there is another advantage in that the first guide groove 14 and the second guide groove 16 both having a V-shaped cross section can be formed very readily by performing anisotropic etching which depends upon a certain crystal orientation of the silicon substrate (single crystal).

Or, the fiber substrate 15 which is first constructed as a portion of the waveguide substrate 11 on which the second guide groove 16 for fixation of an optical fiber is formed as an extension of the first guide groove 14 simultaneously upon production of the waveguide substrate 11 and is thereafter formed as a separate member from the waveguide substrate 11 by being cut from the waveguide substrate 11 and on which the optical fiber 13 is held may be prepared, and the waveguide 12 and the optical fiber 13 may be connected to each other using the fiber substrate 15 on which the optical fiber 13 is held. In this instance, simultaneously upon production of the waveguide substrate 11, the fiber substrate 15 having the second guide groove 16 for fixation of an optical fiber can be produced readily and efficiently.

For the connection between the waveguide 12 and the optical fiber 13, the waveguide substrate 11 is employed which comprises the substrate portion 11A having the waveguide 12 integrally formed thereon and having the first guide groove 14 formed adjacent the end portion 12a of the waveguide 12 thereon for positioning the optical fiber 13, the waveguide 12 and the first guide groove 14 being formed using a single mask member having patterns for formation of a waveguide and a guide groove. Where the waveguide substrate 11 of the construction just described is employed, the waveguide 12 and the optical fiber 13 tan be connected and fixed to each other readily with a high degree of accuracy and with a high degree of reliability such that an optical signal can be communicated at a low loss between them, and mass production and reduction in cost of waveguide circuits can be realized.

The waveguide substrate 11 of the construction described above is produced by a method which comprises the steps of forming a low refraction index layer and a high refraction index layer on a silicon substrate (substrate portion 11A), partially removing the high refraction index layer using a single mask member having patterns for formation of a waveguide and a guide pattern to form etching areas for the waveguide 12 and the guide groove 14, and forming an upper low refraction index layer while the mask member on the opposite sides of the etching area for the guide groove 14 is left as a fiber positioning etching mask, forming a guide groove 14 and finally removing the etching mask. In this instance, the step of forming an upper low refraction index layer on the etching mask may include the step of forming a thin film of a SiO$_2$ material between the upper low refraction index layer and the etching mask.

The waveguide substrate 11 is produced very readily in such a manner as described above. Further, where a thin film of a SiO$_2$ material is formed between the low refraction index layer and the etching mask, an upper low refraction index layer can be formed on the etching mask by a flame deposition method.

Further, for the connection between the waveguide 12 and the optical fiber 13, the optical fiber 13 with a fiber substrate is used which comprises an optical fiber having, at an end portion thereof, a metal coating provided on an outer periphery of a clad thereof, and the fiber substrate 15 having the second guide groove 16 for fixation of an optical fiber formed thereon and coated with a metal film, the end portion of the optical fiber being fixed by metal fixation to the second guide groove 16 of the fiber substrate 15. Where the fiber substrate 15 with the optical fiber 13 (optical fiber with a fiber substrate) having the construction just described is employed, the waveguide 12 and the optical fiber 13 can be connected and fixed to each other readily with a high degree of accuracy and with a high degree of reliability such that an optical signal can be communicated at a low cost between them, and mass production and reduction in cost of waveguide circuits can be realized.

The end portion of the optical fiber at which the optical fiber is coated with the metal coating only in an area of the outer periphery of the clad thereof necessary for metal fixation of the optical fiber to the second guide groove 16 of the fiber substrate 15 may be fixed by metal fixation to the second guide groove 16 of the fiber substrate 15 in a condition wherein it is mounted in the second guide groove 16 of the fiber substrate 15 to provide the fiber substrate 15 at the end portion of the optical fiber. Alternatively, the fiber substrate 15 may be provided at the end portion of the optical fiber by fixing the end portion of the optical fiber to the fiber substrate 15 by metal fixation by mounting the end portion of the optical fiber in the second guide groove 16 of the fiber substrate 15 on which a solder supply groove for flowing in therethrough solder to be used for metal fixation to the end portion of the optical fiber is formed in a communicating relationship with the second guide groove 16 and flowing solder in through the solder supply groove.

Where the metal coating is provided only in the area necessary for metal fixation as described above, that is, where no metal coating is applied to the other area in which the outer periphery of the clad of the optical fiber 13 closely contacts with the first guide groove 14 of the waveguide substrate 11, useless metal coating can be eliminated, and also precision film thickness control over the entire outer periphery of the optical fiber is unnecessary. Further, where solder is flowed in through the solder supply groove as described above, the optical fiber 13 can be fixed to the fiber substrate 15 very readily.

It is to be noted that an optic axis direction positioning mechanism may be provided over the waveguide substrate 11 and the fiber substrate 15 for positioning the optical fiber 13 in a direction of its optic axis. By means of the optic axis direction positioning mechanism, the optical fiber 13 can be located at an optimum position in the direction of the optic axis thereof with respect to the waveguide 12 without any adjustment.

The optic axis direction positioning mechanism may include a recessed portion formed on one of the waveguide substrate 11 and the fiber substrate 15 and a complementary projected portion formed on the other of the waveguide substrate 11 and the fiber substrate 15. In this instance, the position of the optical fiber 13 in the direction of its optic axis can be determined by fitting the recessed portion and the projected portion with each other.

Alternatively, the optic axis direction positioning mechanism may include a dicing groove formed on the waveguide substrate 11 and a projected portion formed on the fiber substrate 15 for fitting in the dicing groove. In this instance, the position of the optical fiber 13 in the direction of its optic axis can be determined by fitting the projected portion on the fiber substrate 15 into the dicing groove.

Where the optical fiber 13 is formed as a tapered spherically ended optical fiber, the optic axis direction positioning mechanism may be a grooved portion formed at an end portion of the first guide groove 14 adjacent the waveguide 12 and having a width smaller than that of the first guide groove 14 for abutting with an end portion of the tapered spherically ended optical fiber. In this instance, the position of the optical fiber 13 in the direction of its optic axis can be determined by abutting the end portion of the optical fiber 13 with the grooved portion.

Since the optical fiber 13 can be located at an optimum position in the direction of its optic axis with respect to the waveguide 12 without any adjustment by means of the optic axis direction positioning mechanism described above, the end face of the optical fiber 13 or the waveguide 12 can be prevented from being damaged. Further, the waveguide 12 and the optical fiber 13 can be connected and fixed to each other readily with a high degree of accuracy and with a high degree of Reliability with a simple structure such that an optic sIgnal can be communicated at a low loss between them. Consequently, the optic axis direction positioning mechanism contributes to mass production and reduction in cost of waveguide circuits.

Figure 4:
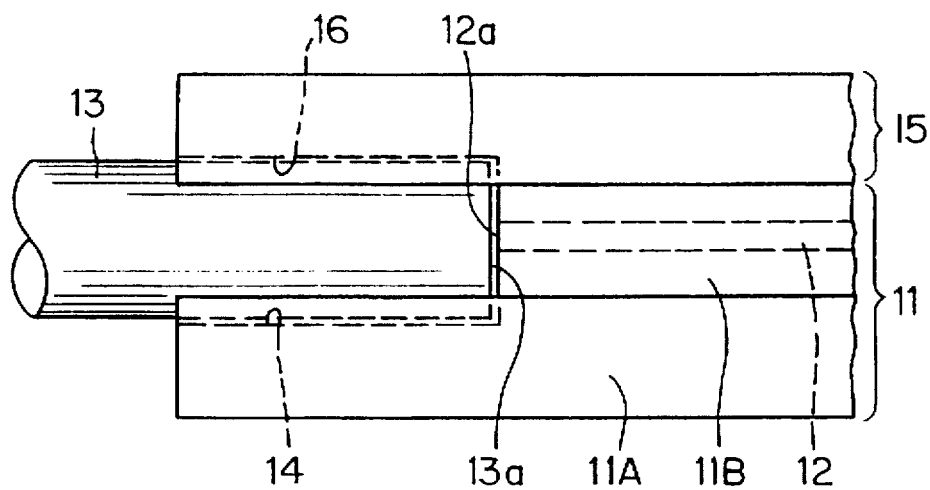

FIG. 4 shows a side elevational view of a further waveguide-optical fiber connection structure and illustrates a further aspect of the present invention. Referring to FIG. 4. the waveguide-optical fiber connection structure shown includes, in addition to an optical fiber 13 and a waveguide substrate 11 which are similar to those described above with reference to FIG. 1, a fiber substrate 15 having a second guide groove 16 formed therein for positioning the optical fiber 13. The fiber substrate 15 is fixed to the waveguide substrate 11 with the second guide groove 16 thereof opposed to the first guide groove 14.

Then, an end portion (end face) 12a of the waveguide 12 and an end portion (end face) 13a of the optical fiber 13 are connected to each other by inserting and fixing the optical fiber 13 between the waveguide substrate 11 (substrate portion 11A) and the fiber substrate 15 along the first guide groove 14 and the second guide groove 16.

A method of the present invention for connecting the waveguide 12 and the optical fiber 13 to each other to obtain the structure described above with reference to FIG. 4 will be described below with reference to FIG. 4. According to the waveguide-optical fiber connection method of the present invention, a waveguide substrate 11 having a waveguide 12 and a first guide groove 14 formed thereon and a fiber substrate 15 having a second guide groove 16 formed therein for positioning the optical fiber 13 are prepared.

Then, the fiber substrate 15 is fixed to the waveguide substrate 11 (waveguide formation layer 11B) with the second guide groove 16 thereof opposed to the first guide groove 14, and then, the optical fiber 13 is inserted and fixed between the waveguide substrate 11 (substrate portion 11A) and the fiber substrate 15 along the first guide groove 14 and the second guide groove 16.

With the waveguide-optical fiber connection structure and method described above, the position of the optical fiber 13 with respect to the waveguide 12 can be determined without any adjustment, and the end portion 12a of the waveguide 12 and the end portion 13a of the optical fiber 13 can be connected to each other readily with a high degree of accuracy and with a high degree of reliability such that an optical signal can be communicated at a low loss between them. Consequently, there is an advantage in that mass production and reduction in cost of waveguide circuits can be realized.

The waveguide 12 and the optical fiber 13 may be connected to each other using the waveguide substrate 11 wherein the quartz (SiO$_2$) waveguide 12 and the first guide groove 14 of a V-shaped cross section are formed on a silicon substrate (substrate portion 11A) and the fiber substrate 15 wherein the second guide groove 16 of a V-shaped cross section is formed on the silicon substrate. In this instance, the waveguide substrate 11 and the fiber substrate 15 may be fixed to each other by anode joining.

Where the waveguide substrate 11 and the fiber substrate 15 described above are employed, the waveguide 12 and the optical fiber 13 can be connected and fixed to each other readily with a high degree of accuracy and with a high degree of reliability with a simple structure such that an optical signal can be communicated at a low loss between them, and consequently, mass production and reduction in cost of waveguide circuits can be realized. Also there is another advantage in that the first guide groove 14 and the second guide groove 16 both having a V-shaped cross section can be formed very readily by performing anisotropic etching which relies upon a certain crystal orientation of the silicon substrate (single crystal).

In this instance, if each of the waveguide substrate 11 and the fiber substrate 15 is constituted from a silicon substrate, the waveguide substrate 11 and the fiber substrate 15 can be joined by anode joining to each other. In this instance, the waveguide substrate 11 and the fiber substrate 15 can be joined to each other by the force between atoms of silicon and by the covalent bond. Consequently, the waveguide substrate 11 and the fiber substrate 15 can be fixed to each other readily and firmly.

A first communication path which communicates with a space between the end portion 12a of the waveguide 12 and the end portion 13a of the optical fiber 13 may be formed in the fiber substrate 15, and the optical fiber 13 may be fixed to the waveguide 12 by injecting a light setting resin into the space between the end portion 12a of the waveguide 12 and the end portion 13a of the optical fiber 13 by way of the first communication path and introducing light of a predetermined wavelength to the optical fiber 13 to harden the light setting resin. Here, second communication path which communicates with the second guide groove 16 may be formed in the fiber substrate 15, and the optical fiber 13 may be fixed to the waveguide 12 by means of a bonding agent injected in through the second communication path. In this instance, the optical fiber 13 can be fixed readily and with certainty to the waveguide 12 using a light setting resin, and the fixation strength of the optical fiber 13 can be increased by means of a bonding agent.

Or else, the outer periphery of the clad of the optical fiber 13 as well as the surface portion of the fiber substrate 15 and the opposing surface portion of the waveguide substrate 11 may individually be coated with metal films while a solder communication path for flowing solder in therethrough is formed in a communicating relationship with the second guide groove 16 on the fiber substrate 15, and the optical fiber 13 may be fixed to the waveguide 12 by flowing solder into a space among the metal films by way of the solder communication path. Thus, the optical fiber 13 can be fixed between the waveguide substrate 11 and the fiber substrate 15 with certainty by metal fixation by soldering.

In this instance, a communication path which communicates with a space between the end portion 12a of the waveguide 12 and the end portion 13a of the optical fiber 13 may be formed in the fiber substrate 15, and the optical fiber 13 may be fixed to the waveguide by soldering and a light setting resin may be injected into the space between the end portion 12a of the waveguide 12 and the end portion 13a of the optical fiber 13 by way of the communication path, whereafter light of a wavelength is introduced to the optical fiber 13 to harden the light setting resin.

By introducing light of a predetermined wavelength to the optical fiber 13 to harden a light setting resin injected into the space between the end portion 12a of the waveguide 12 and the end portion 13a of the optical fiber 13 after fixation of the optical fiber 13 by soldering, the waveguide 12 and the optical fiber 13 are connected to each other. Consequently, the optical fiber 13 can be fixed to the waveguide 12 readily and with certainty.

b. First Embodiment

Figure 5:
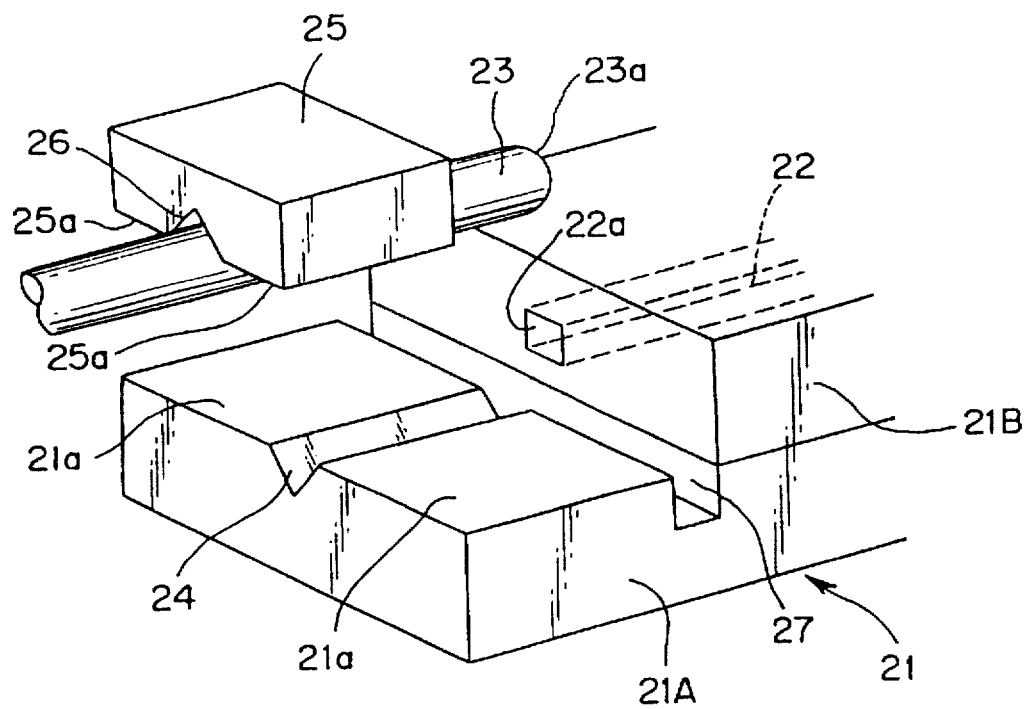
FIG. 5 is an exploded perspective view of a waveguide-optical fiber connection structure, a waveguide circuit substrate and an optical fiber with a fiber substrate showing a first preferred embodiment of the present invention.

Referring now to FIG. 5, there are shown a waveguide-optical fiber connection structure formed by a waveguide-optical fiber connection method and a waveguide substrate and an optical fiber with a fiber substrate used for the connection according to a first preferred embodiment of the present invention.

The waveguide-optical fiber connection structure shown includes a waveguide substrate 21, and an optical fiber 23 with a fiber block (fiber substrate) 25. The waveguide substrate 21 includes a Si substrate 21A serving as a substrate body thereof, and a SiO$_2$ (quartz) layer 21B on which a waveguide (core portion) 22 is formed. The Si substrate 21A has a first guide groove 24 of a V-shaped cross section formed thereon adjacent an end portion (end face) 22a of the waveguide 22 for positioning the optical fiber 23 on an extension line of an optic axis of the waveguide 22.

The fiber block 25 is fixed to an end portion of the optical fiber 23. The fiber block 25 has a second guide groove 26 of a V-shaped cross section formed thereon for fixing an optical fiber, and the optical fiber 23 is fixed in the second guide groove 26 and thus held on the fiber block 25.

An end portion (end face) 23a of the optical fiber 23 is connected to the end portion (end face) 22a of the waveguide 22 by fixing a face portion 21a of the waveguide substrate 21 and an opposing face portion 25a of the fiber block 25 to each other while the optical fiber 23 fixed to the fiber block 25 is held in close contact with the first guide groove 24 on the waveguide substrate 21.

In the connection method of the present invention, while the optical fiber 23 fixed to the fiber block 25 in advance is fixed such that a peripheral portion (clad portion) thereof closely contacts with the first guide groove 24 on the waveguide substrate 21 while the first guide groove 24 for positioning a fiber is formed with a high degree of accuracy, the position of the optical fiber 23 with respect to the waveguide 22 can be determined without any adjustment, and the end portion 22a of the waveguide 22 and the end portion 23a of the optical fiber 23 can be connected to each other readily such that an optical signal may be communicated with a low loss between them.

In the following, an outline of the connection structure, the waveguide substrate waveguide substrate 21 and a method of producing the waveguide supstrate waveguide substrate 21 in the first embodimetnt and characteristics of them will be described.

The first guide groove 24 on the waveguide substrate 21 (Si substrate 21A) for positioning a fiber provides a high coupling loss if it is not formed with a high degree of accuracy with respect to the waveguide 22. For example, where an ordinary single mode fiber (mode field diameter: 10 μm) is connected to the waveguide 22 whose mode field diameter is approximately 10 μm, an offset of 2 μm will cause a loss of 1 to 2 dB. Accordingly, the reduction of the connection loss and the characteristic of reproducibility depend upon with what degree of accuracy the optical fiber can be positioned with respect to the center axis of the waveguide 22.

First, as regards positioning in the vertical direction, the first guide groove 24 for positioning a fiber which is applied in the present connection structure is a groove of a V-shaped cross section formed by anisotropic etching which relies upon a certain crystal orientation of the Si substrate (single crystal) 21A, and the first guide groove 24 can be formed with a high degree of reproducibility by controlling the setting of conditions upon etching.

Figure 6:
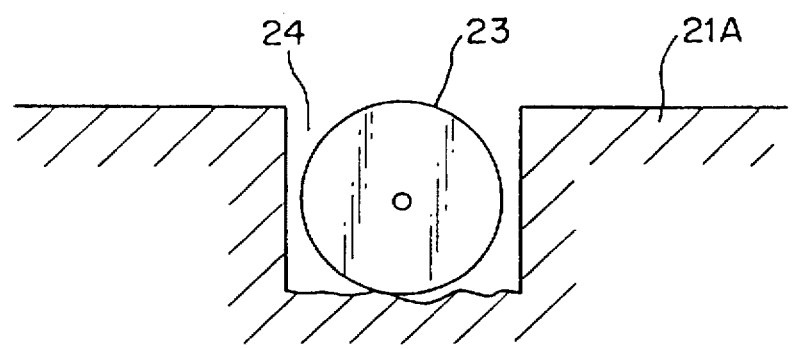
FIG. 6 is a cross sectional view showing a guide groove having a U-shaped cross section which may be employed in the first embodiment.
Figure 7:
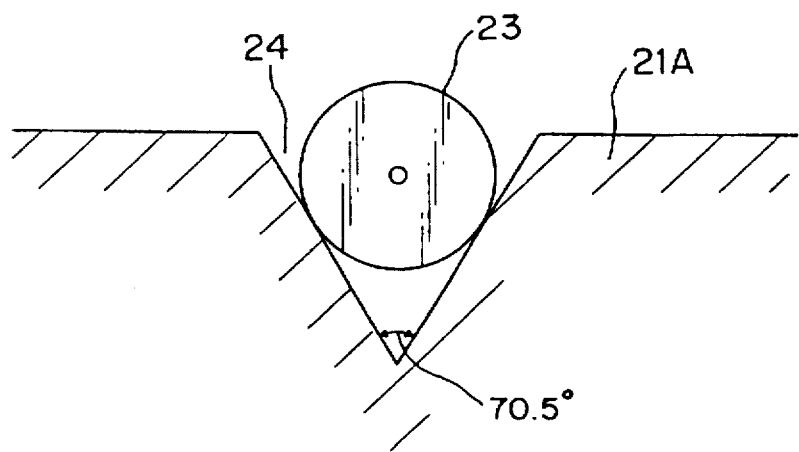
FIG. 7 is a cross sectional view showing another guide groove having a V-shaped cross section employed in the first embodiment.
Figure 8:
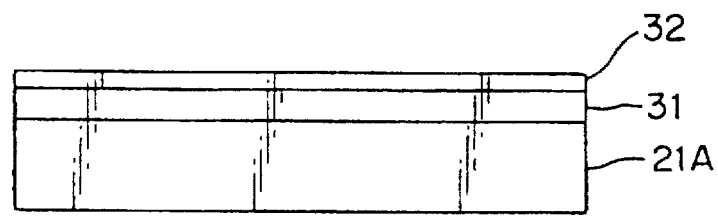
FIG. 8 is a schematic side elevational view illustrating a step of a process production of the waveguide substrate in the first embodiment.

It is to be noted that, although the first guide groove 24 may have such a U-shaped cross section as shown in FIG. 6, where the U-shape is employed, the depth of the groove must be controlled in terms of the etching time. In contrast, where such a V-shaped cross section as shown in FIG. 7 is employed, the optical fiber 23 contacts with inclined faces of the first guide groove 24, and accordingly, the controllability in the vertical direction (depthwise direction) of the optical fiber 23 to be fixed on the first guide groove 24 is improved comparing with that by the depth control necessitated with the U-shaped cross section (the tolerance may be 1.4 times that of a guide groove of a U-shaped cross section).

For example, where the formation accuracy of the width of a mask pattern for forming the first guide groove 24 of the V-shaped cross section is ±1 µm, the amount of an offset of the optical fiber 23 in the vertical direction can be suppressed approximately to ±0.7 µm. Actually, with a technique which employs photo-lithography, the offset amount can be suppressed less than ±5 µm, which is a level which matters little.

Subsequently, as regards positioning of the optical fiber in the leftward and rightward direction with respect to the waveguide 22, in order to connect the optical fiber and the waveguide 22 with a high degree of reproducibility to each other such that an optical signal may be communicated with a low loss between them, the first guide groove 24 of a V-shaped cross section must be formed with a high degree of accuracy with respect to the center axis of the waveguide 22. By multiple formation of the first guide groove 24 of a V-shaped cross section by photolithography which is used popularly, it is difficult to form a groove of a V-shaped cross section having designed dimensions with a high degree of accuracy due to formation on a high offset, a distribution in a substrate (dislocation caused by deformation of a substrate arising from distortion or the like) and so forth.

As one of means for overcoming the difficulty, an etching mask for forming a first guide groove of a V-shaped cross section is formed at the step of forming the waveguide (core portion) 22, and the pattern is left till the step of forming the first guide groove 24, whereafter the pattern is removed at the last step.

By the method described above, the waveguide substrate 21 wherein the waveguide 22 and the first guide groove 24 for positioning a fiber are formed with a high degree of accuracy on the Si substrate 21A is produced.

Subsequently, the optical fiber 23 is fixed to the first guide groove 24 of a V-shaped cross section formed on the Si substrate 21A using a bonding agent, a soldering material or some other suitable means, and then the optical fiber 23 is fixed such that a circumferential face (clad) of the optical fiber 23 closely contacts with the first guide groove 24 formed on the waveguide substrate 21. Fixation between the waveguide substrate 21 and the fiber block 25 can be achieved by soldering where metal films are formed on the opposing face portions 21a and 25a of the waveguide substrate 21 and the fiber block 25 as hereinafter described.

The amount of a bonding agent or a soldering material to be used upon fixation must be controlled to some degree, and if the amount is excessively great, then the surplus bonding agent or soldering material may flow out to the first guide groove 24 or the surface of the optical fiber 23 to make an obstacle to the intended positioning. However, the controllable range is increased and fixation is facilitated by providing a flow groove and an escape groove. The grooves can be formed simultaneously with the formation of the guide groove, and the formation of the grooves does not require a special positioning operation where a same photo-lithography mask as a mask for a guide groove pattern is used.

The optical fiber 23 can be positioned with respect to and connected to the waveguide 22 readily only by pressing the optical fiber 23 against the first guide groove 24 which is formed with a high degree of accuracy. Further, the optical fiber 23 can be fixed with a high degree of reliability by using soldering or a like means.

It is to be noted that reference numeral 27 denotes a cut groove formed by means of a dicing saw used to form the end portion 22a of the waveguide 22 (to form a mirror face).

Subsequently, the waveguide-optical fiber connection structure and method as well as the waveguide substrate for use for the connection and the method of producing the waveguide substrate and also the optical fiber with a fiber substrate for use for the connection according to the first embodiment of the present invention will be described with reference to FIGS. 8 to 33.

FIGS. 8 to 18 illustrate several steps of the process of producing the waveguide substrate in the first embodiment of the present invention. In the process, a low refraction index layer (lower clad layer) 31 and a high refraction index layer (core layer) 32 are deposited, for example, by a flame deposition method or a CVD (chemical vapor deposition) method on a Si substrate 21A of the crystal face of 100 on which a first guide groove 24 of a V-shaped cross section is to be formed. The thicknesses of the layers 31 and 32 are approximately 20 µm and 10 µm, respectively.

Figure 9:
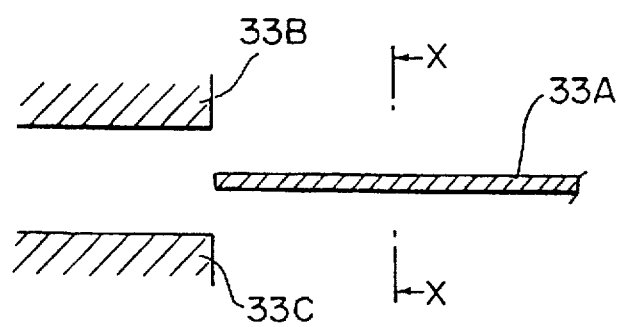
FIG. 9 is a plan view showing a mask pattern (mask member) and illustrating another step of the process of producing the waveguide substrate in the first embodiment.
Figure 10:
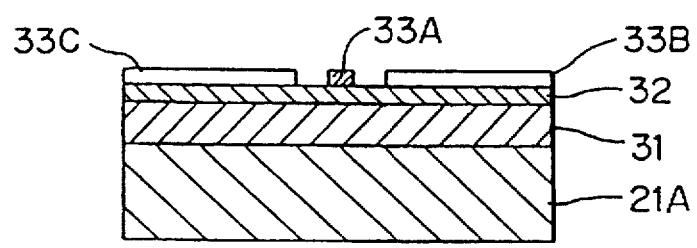
FIGS. 10 to 13 are cross sectional views taken along line X—X in FIG. 9 but illustrating different steps of the process of producing the waveguide substrate in the first embodiment.
Figure 11:
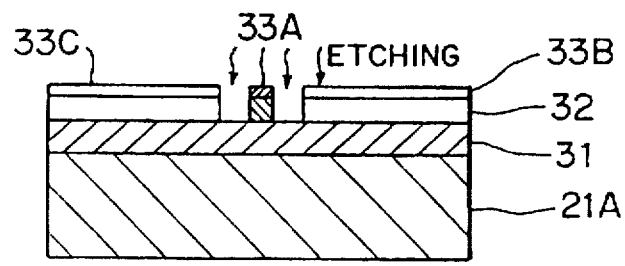

Subsequently, mask patterns (mask members) 33A, 33B and 33C of a film of Si, Cu or some other suitable material are partially formed on the high refraction index layer 32 as shown in FIGS. 9 and 10. It is to be noted that, in the first embodiment, a Si film is formed for the mask patterns. For the mask patterns 33A to 33C thus formed, a material having a lower etching rate than those for the low refraction index layer 31 and the core layer 32 is employed. A portion of the high refraction index layer 32 covered with the mask pattern 33A makes a waveguide formation area in which a waveguide is to be formed, and pre-mask patterns for formation of a first guide groove of a V-shaped cross section is formed from the mask patterns 33B and 33C on an extension line of the waveguide formation area. In other words, the first guide groove 24 for positioning a fiber is formed at an uncovered portion of the high refraction index layer 32 held between the mask patterns 33B and 33C as hereinafter described.

The mask patterns 33A to 33C are deposited by vapor deposition, sputtering or some other suitable means, and the mask pattern 33A for formation a waveguide and the pre-masle patterns mask patterns 33B and 33C for formation of a guide groove are formed in a very accurately positioned condition by performing a same photo-lithographic mask processing+etching step (RIE (reactive ion etching) or the like). The mask patterns 33A to 33C are formed with a thickness sufficient to allow the mask patterns 33B and 33C for formation of a guide groove to bear etching by RIE or the like which will be hereinafter described, for example, approximately 5 µm.

A portion of the high refraction index layer 32 on which the mask patterns 33A to 33C described above are not formed is etched as shown in FIG. 11 using a RIE equipment or some other suitable apparatus. As a result of the etching, a core portion (waveguide) 22 and a primary mask pattern (only high refraction index layer) for formation on a guide groove on the extension line of the waveguide 22 are formed.

Figure 12:
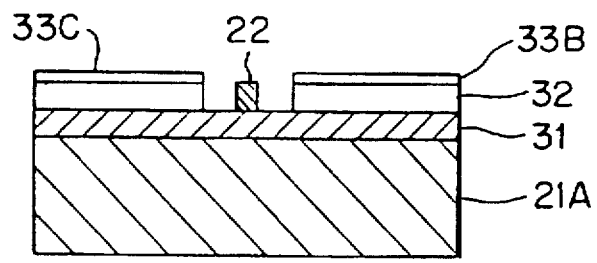

Here, if the mask pattern 33A is present on the waveguide 22, since light to be propagated is absorbed by the mask pattern 33A, only the mask patterns 33B and 33C of the guide groove formation area are protected while only the mask pattern 33A on the waveguide 22 is removed by etching as shown in FIG. 12.

Figure 13:
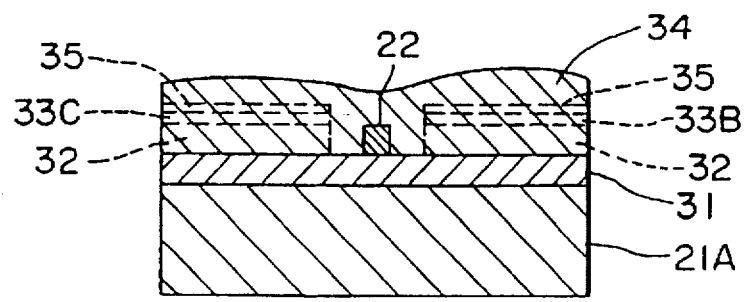

In the condition shown in FIG. 12, a low refraction index layer (upper clad layer or upper low refraction index layer) 34 is formed with a thickness of approximately 20 µm on the entire area as shown in FIG. 13, for example, by a CVD method. In this instance, the low refraction index layer 34 is formed while the primary mask patterns 33B and 33C for formation of a guide groove are left. However, when the low refraction index layer 34 is formed by a flame deposition method, the low refraction index layer 34 must be formed between the mask patterns 33B and 33C with a thin film 35 of a SiO$_2$ material interposed therebetween.

Figure 14:
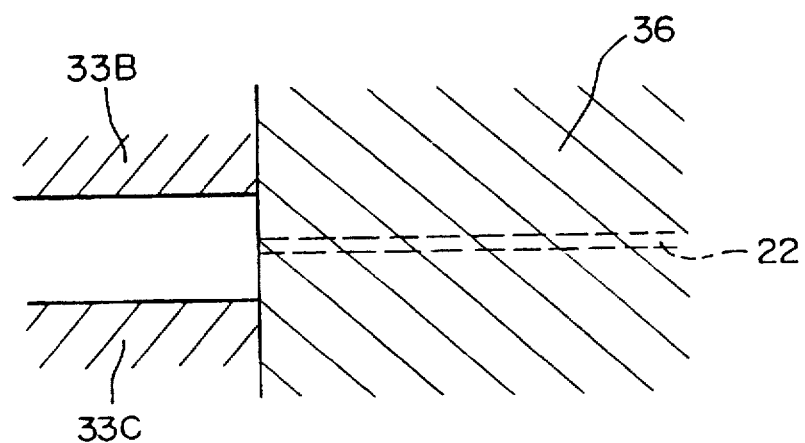
FIG. 14 is a plan view showing the arrangement of the mask and illustrating a different step of the process of producing the waveguide substrate in the first embodiment.

Then, a mask material similar to that described hereinabove with reference to FIGS. 9 and 10 is deposited and patterned to form a mask 36 as shown in FIG. 14 so that the area of the low refraction index layers 34 and 31 including the waveguide (core portion) 22 may be protected against etching. The film thickness of the mask 36 used here may be approximately 5 µm.

Figure 15:
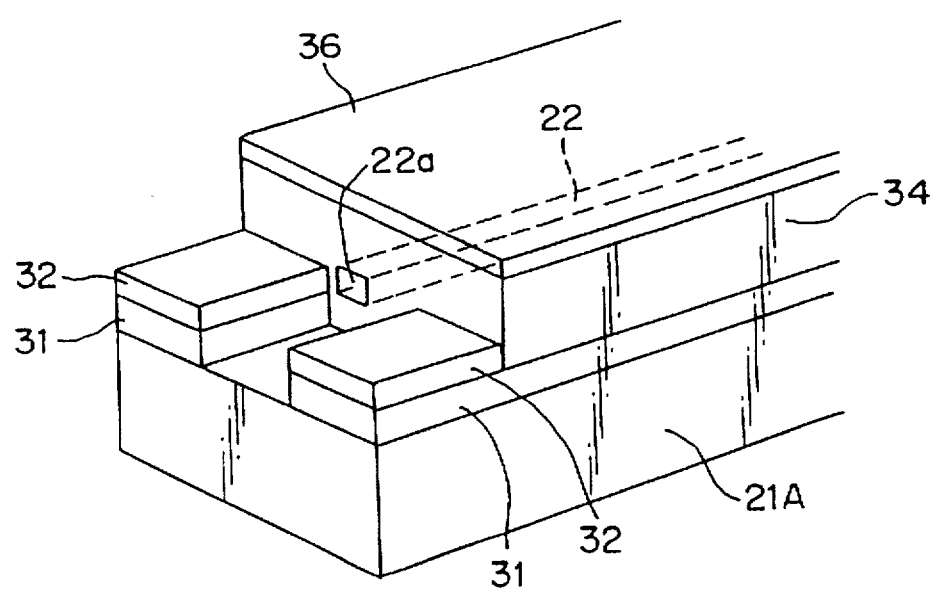
FIGS. 15 to 18 are perspective views illustrating further different steps of the process of producing the waveguide substrate in the first embodiment.

Further, while the areas of the low refraction index layer 34 and 31 including the waveguide (core portion) 22 is held protected with the mask 36, etching is performed by means of a RIE equipment or some other suitable apparatus until the Si substrate 21A (crystal face: 100) of the guide groove formation section is exposed as shown in FIG. 15.

In this instance, since the areas of the low refraction index layers 34 and 31 including the waveguide (core portion) 22 are protected with the metal mask 36, they are not etched. Also for the guide groove formation portion, the mask material left at the preceding step serves as a protector against etching so that a guide groove etching mask having a film thickness corresponding to the core (waveguide 22) t lower clad layer (low refraction index layer 31) is formed finally.

Figure 16:
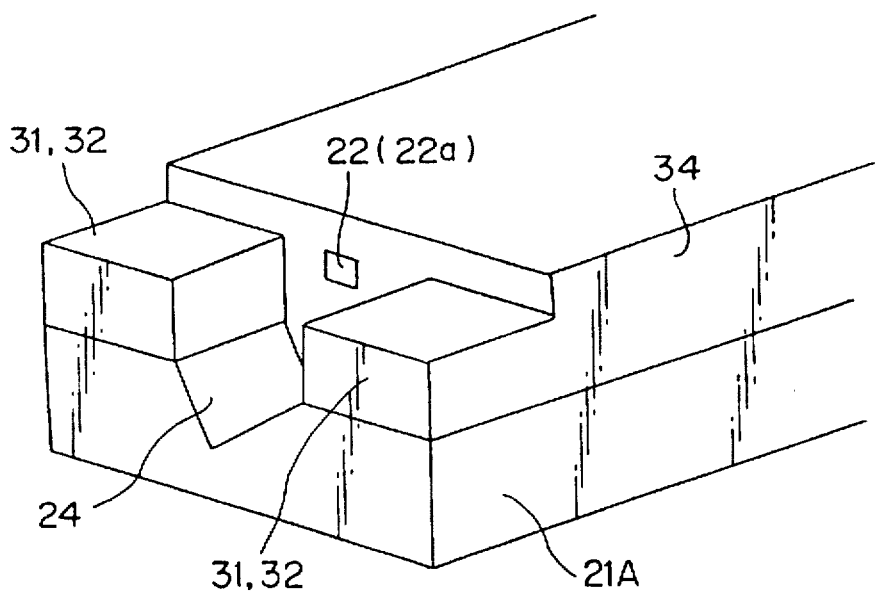
Figure 17:
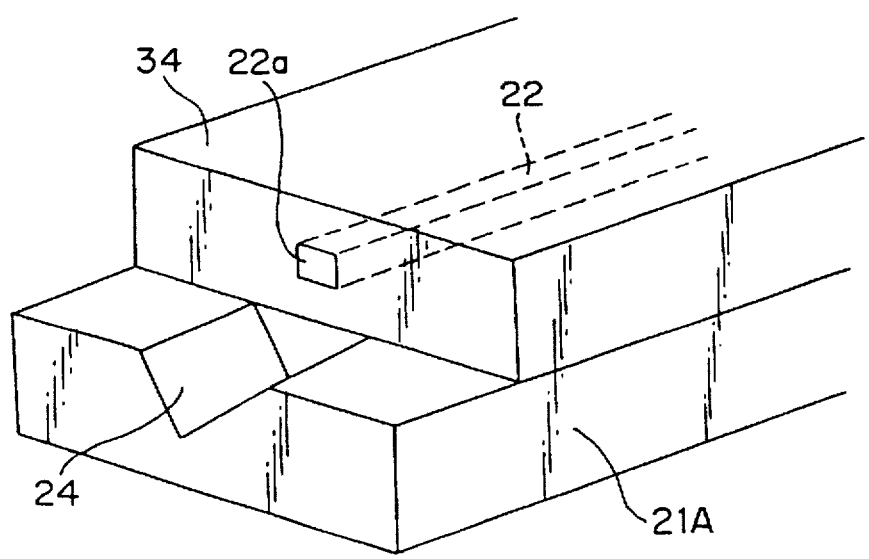

Thereafter, using the guide groove etching mask (low refraction index layer 31 and high refraction index layer 32.) having the thickness of the core+lower clad layer formed in such a manner as shown in FIG. 15, wet etching is performed to form a first guide groove 24 at the exposed portion of the Si substrate 21A as shown in FIG. 16. For the etchant here, for example, a mixture of pyrocatechol of 4 mol percent, ethylene diamine of 46.4 mol percent and water of 49.4 mol percent or KOH or some other suitable material is used.

The first guide groove 24 of a V-shaped cross section is formed due to a difference in etching rate in plane directions, which is peculiar to single crystal of Si, and adjustment of the height of an optical fiber 23 to be fixed can be performed readily with a high degree of accuracy by controlling the width and the etching time of the etching mask. Here, the center of the core of the waveguide 22 is positioned at the distance of 25 µm from the surface of Si, and when an optical fiber 23 (diameter: 125 µm) is to be coupled at the position, the pattern distance (distance between the mask patterns 33B and 33C) for formation of the first guide groove 24 is approximately 120 µm.

At a stage when the step of formation of the first guide groove 24 is completed in such a manner as described above, the mask pattern (low refraction index layer 31 and high refraction index layer 32) for formation of a guide groove, which is unnecessary any more, is removed. Such removal may be performed by wet etching using a mixture of hydrofluoric acid+ammonium fluoride+water or by dry etching with the waveguide portion protected with a metal film.

Figure 18:
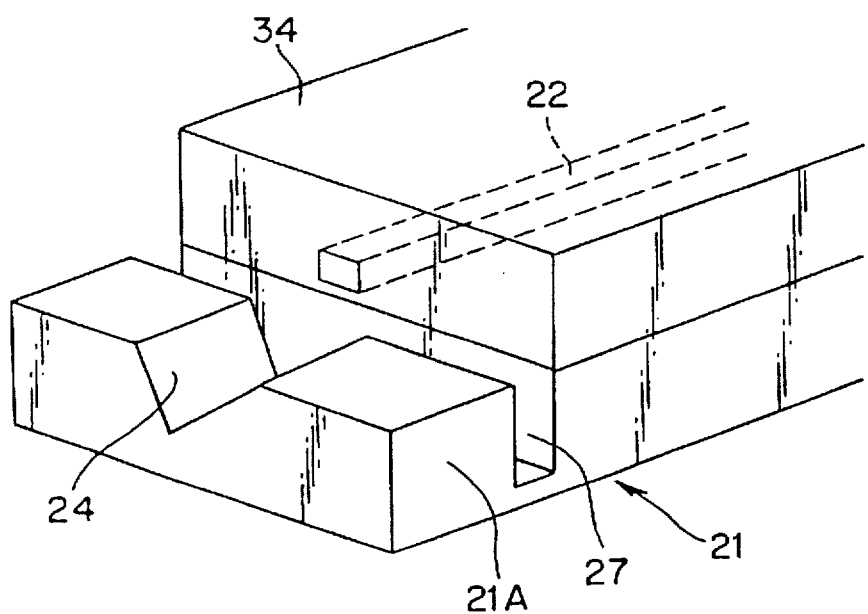
Figure 19:
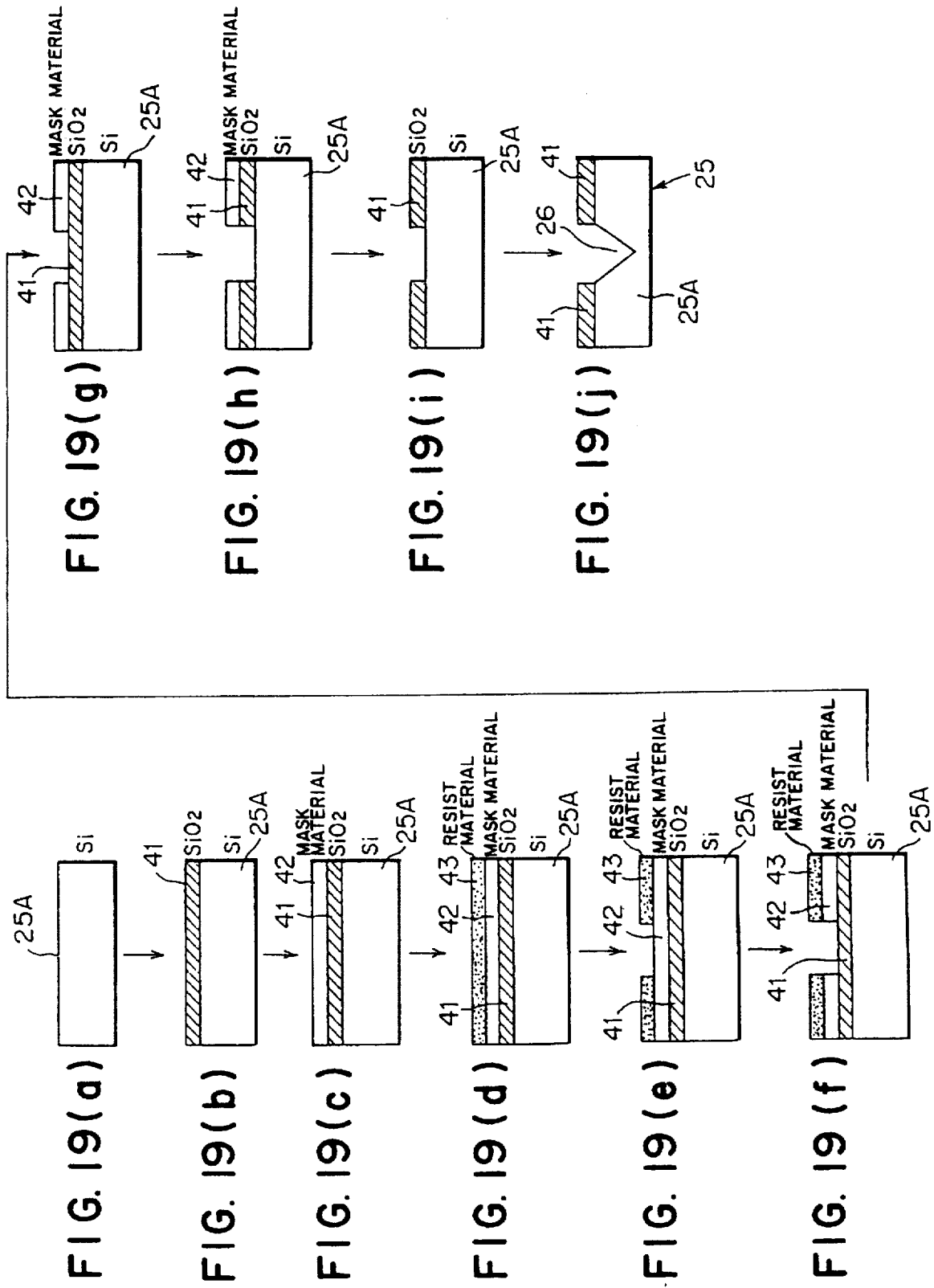
FIGS. 19(a) to 19(j) are schematic cross sectional views illustrating different steps of a process of producing a fiber block in the first embodiment.

After the etching mask for formation of a guide groove is removed, formation of an end face (formation of a mirror face) of the waveguide (core portion) 22 is performed using a precision cutting saw (dicing saw) to form a cut groove 27 between the waveguide 22 and the first guide groove 24 as shown in FIG. 18. The cutting line in this instance is formed so as to extend to the depth of about 200 µm in the Si substrate 21A. Further, the cutting line width may be about 200 µm, and where such cut groove 27 is provided, an obstacle, etching waste or the like produced at a boundary portion between the waveguide 22 and the first guide groove 24 can be removed by way of the cut groove 27.

Figure 32:
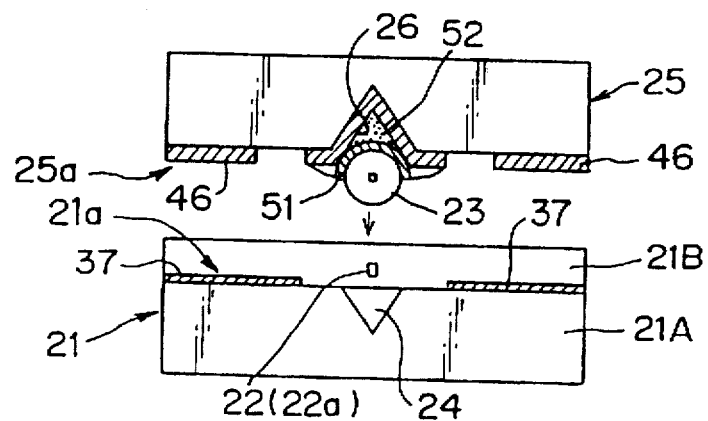
Figure 33:
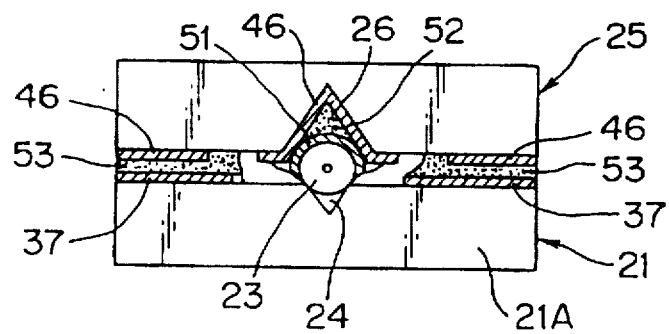
FIG. 33 is a front elevational view showing between the fiber block and the waveguide substrate in the first embodiment in a mutually fixed condition.

Then, when the waveguide substrate 21 produced in such a manner as described above and the fiber block 25 produced in such manner as hereinafter described with reference to FIGS. 19 to 23 are to be fixed to each other by soldering, a metal film 37 is formed on the face portion 21a of the Si substrate 21A of the waveguide substrate 21 as shown in FIGS. 32 and 33 at the preceding step for formation of an end face. The film thickness of the metal film 37 is, where, for example, Au is used, Ti: 1,000 angstrom+Au: 2,000 angstrom.

At the steps described hereinabove with reference to FIGS. 8 to 18, the waveguide 22 and the first guide groove 24 for positioning a fiber on an extension line of the waveguide 22 are formed on the Si substrate 21A.

Subsequently, different steps of a process of producing the fiber block (fiber substrate) 25 of Si having the second guide groove 26 of the V-shaped cross section, which is used to couple the first guide groove 24 formed at the end portion of the waveguide substrate 21 produced in such a manner as described above and an optical fiber 23 further readily and with certainty to each other, will be described with reference to FIGS. 19(a) to 19(j).

As seen from FIGS. 19(a) to 19(j), the fiber block 25 includes a Si substrate 25A (crystal face: 100) on which a pattern of SiO$_2$ is formed by popular photo-lithography. In FIGS. 19(a) to 19(j), reference numeral 41 denotes a SiO2 layer, 42 a mask material, and 43 a resist material.

In the process, the films of the SiO2 layer 41 and the mask material 42 at the steps of FIGS. 19(b) and 19(c) are formed by EB vapor deposition, sputtering or some other suitable means. Further, the patterning at the steps of FIGS. 19(e) to 19(i) is performed by photo-lithography/dry etching and wet etching.

Then, using the mask (SiO$_2$ layer 41) for etching a second guide groove formed by way of the steps of FIGS. 19(a) to 19(i), wet etching is performed to form a second guide groove 26 at an exposed portion of the Si substrate 25A as shown in FIG. 19(j). The etchant then may be, for example, a mixture of pyrocatechol of 4 mol percent, ethylene diamine of 46.4 mol percent and water of 49.4 mol percent or KOH or some other suitable material similarly as upon formation of the first guide groove 24 in the waveguide substrate 21 described above. Similarly as upon formation of the first guide groove 24, also the second guide groove 26 of a V-shaped cross section is formed due to a difference in etching rate in planar directions which is peculiar to single crystal of Si. The size of the second guide groove 26 may be similar to that of the first guide groove 24 formed in the waveguide substrate 21.

Figure 20:
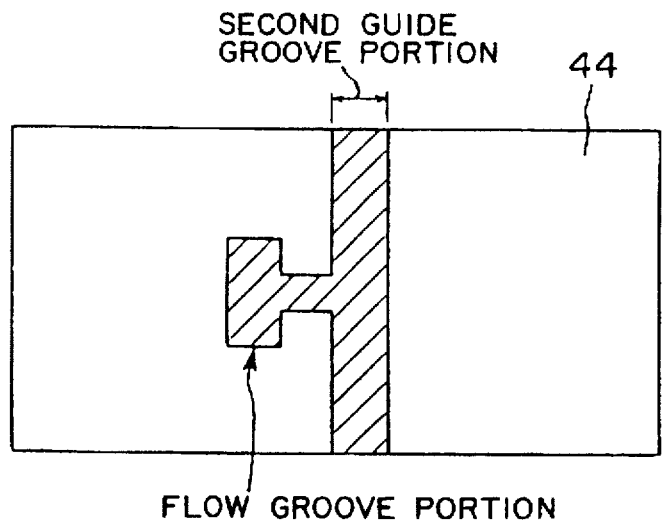
FIG. 20 is a plan view showing the shape of a mask used upon production of the fiber block in the first embodiment.
Figure 21:
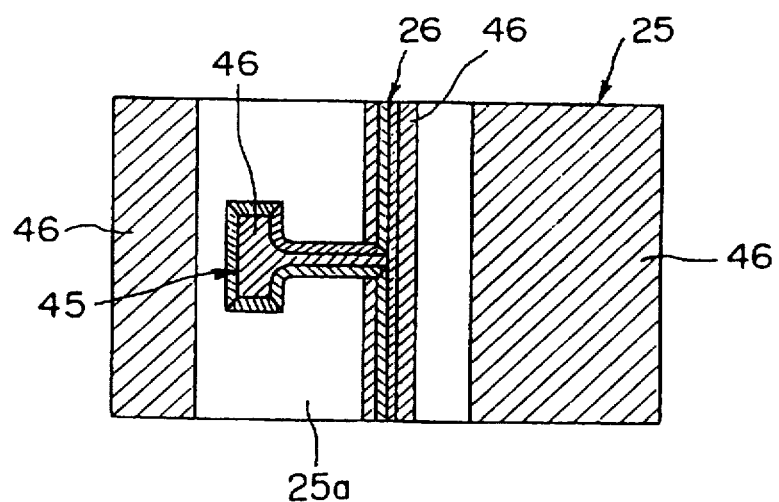
FIGS. 21 and 22 are a plan view and a perspective view, respectively, showing the fiber block and a metal coating for the fiber block in the first embodiment.
Figure 22:
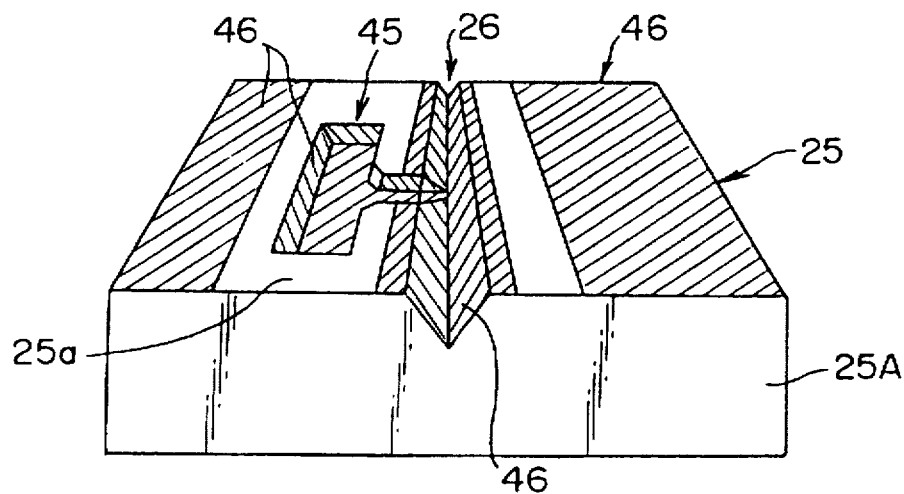

When the second guide groove 26 is formed on the Si substrate 25A as described above, such a photo-lithographic mask 44 as shown in FIG. 20 is used to simultaneously form such a flow groove 45 for solder as shown in FIGS. 21 and 22. In other words, the pattern of the second guide groove 26 for fixation of an optical fiber and the pattern of the flow groove 45 for flowing solder or some other material in therethrough are formed using the same photo-lithographic mask 44.

By the way, if it is intended to fix the waveguide substrate 21, the optical fiber 23 and the fiber block 25 using a bonding agent, the article obtained by the steps described above is cut into a piece of a required size to complete the fiber block 25. However, where soldering is employed for the fixation, the following steps are required.

In particular, after the second guide groove 26 is formed on the surface of the Si substrate 25A, a metal film 46 is formed on the surface of the Si substrate 25A by EB deposition, sputtering or some other suitable means and then patterned as indicated by slanting lines in FIGS. 21 and 22 by photo-lithography. The patterning of the metal film 46 is performed for the inside and the surroundings of the second guide groove 26 necessary for fixation of the optical fiber 23 and similarly for the inside of the flow groove 45 for solder as well as on the face portion 25a of the fiber block 25 to be joined lo the face portion 21a (metal film 37) of the waveguide substrate 21 so that the waveguide substrate 21, the optical fiber 23 and the fiber block 25 may be fixed to each other by soldering.

Then, the article is finally cut into a piece of a required size using a cutting saw, thereby obtaining a fiber block 25 having a second guide groove 26.

Figure 23:
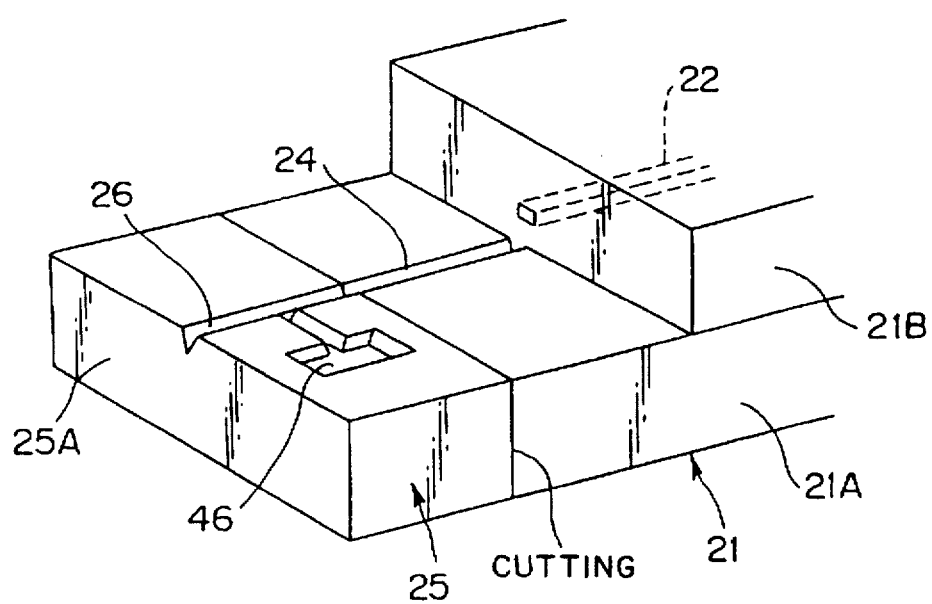
FIG. 23 is a perspective view illustrating a modification to the process of production of the fiber block in the first embodiment.

It is to be noted that, while, in the production method described above, the fiber block 25 is formed on a separate substrate, since the second guide groove 26 has an equal size to that of the first guide groove 24, the fiber block 25 may be formed by cutting away an end portion of the waveguide substrate 21 including the second guide groove 26 after the second guide groove 26 is formed simultaneously with the first guide groove 24 making use of an extension line of the first guide groove 24 of the waveguide substrate 21 as shown in FIG. 23. By such production, the waveguide substrate 21 and the fiber block 25 can be produced efficiently at a time.

Subsequently, working of the optical fiber 23 necessary with the structure in the first embodiment and the fixation method between the fiber block 25 and the optical fiber 23 will be described with reference to FIGS. 24 to 30.

Where the waveguicie substrate 21, the optical fiber 23 and the fiber block 25 are fixed to each other by means of a bonding agent, metallization working for the optical fiber 23 is not required, however, where the waveguide substrate 21, the optical fiber 23 and the fiber block 25 are fixed to each other by soldering as in the first embodiment, metallization of the optical fiber 23 itself is required. It is to be noted, however, that, upon fixation of the optical fiber 23 to the waveguide substrate 21, the optical fiber 23 may be displaced from the waveguide by a soldering material flowing to an unnecessary location or due to a film thickness distribution of a metallization material or the like, and accordingly, the following working for the optical fiber 23 is required.

Figure 24:
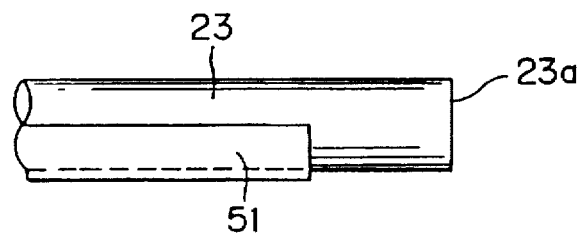
FIG. 24 is a schematic side elevational view showing an end portion of the optical fiber in the first embodiment.
Figure 25:
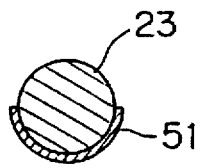
FIG. 25 is a cross sectional view of the end portion of the optical fiber in the first embodiment.
Figure 26:
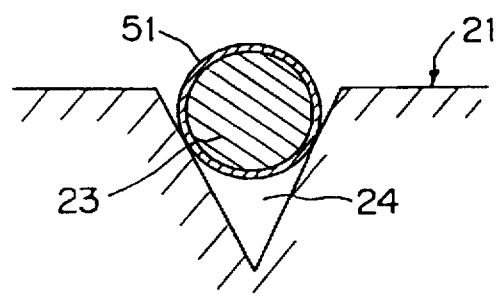
FIG. 26 is a cross sectional view showing another optical fiber having a metal coating provided on the entire outer periphery of a clad thereof.
Figure 27:
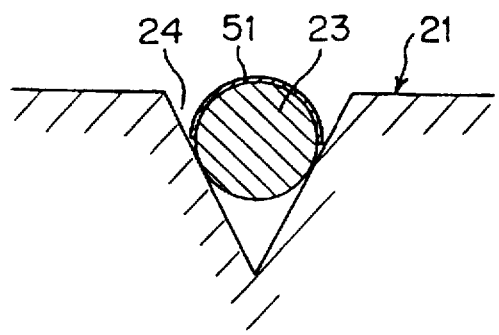
FIG. 27 is a cross sectional view showing a further optical fiber having another metal coating provided on the outer periphery of a clad thereof.

In particular, when it is tried to coat the entire outer periphery of the clad of the optical fiber 23 with a metal film 51 as shown in FIG. 26, precision film thickness control is required for the entire outer periphery of the clad of the optical fiber 23. However, in the first embodiment, since the solder material does not stick to a portion of the outer periphery of the clad of the optical fiber 23 adjacent the first guide groove 24 of the waveguide substrate 21, the metal film 51 is not applied to the portion of the outer periphery of the clad of the optical fiber 23 as shown in FIG. 27. Accordingly, the optical fiber 23 in the present embodiment is coated, only at an area of the outer periphery of the clad thereof necessary for metal fixation to the second guide groove 26 of the fiber block 25, with the metal film 51 as shown in FIGS. 24 and 25.

For example, the following three methods may be available as a method for coating the outer periphery of the clad of the optical fiber 23 with the metal film 51.

① The outer periphery of the clad of the optical fiber 23 is partially protected with a resist material by photo-lithography in advance, and only the necessary area is coated (metallized) with the metal film 51.

② The optical fiber 23 which is metallized over the entire outer periphery thereof is protected at a portion thereof (area for which the metal film 51 is required) with a resist material, and etching is performed to remove an unnecessary portion of the metal film.

③ The optical fiber 23 which is metallized over the entire outer periphery thereof is fixed to the fiber block 25 (refer to FIG. 30), and in this condition, an unnecessary portion of the metal film is removed by processing similar to that employed in the method ② above.

Figure 28:
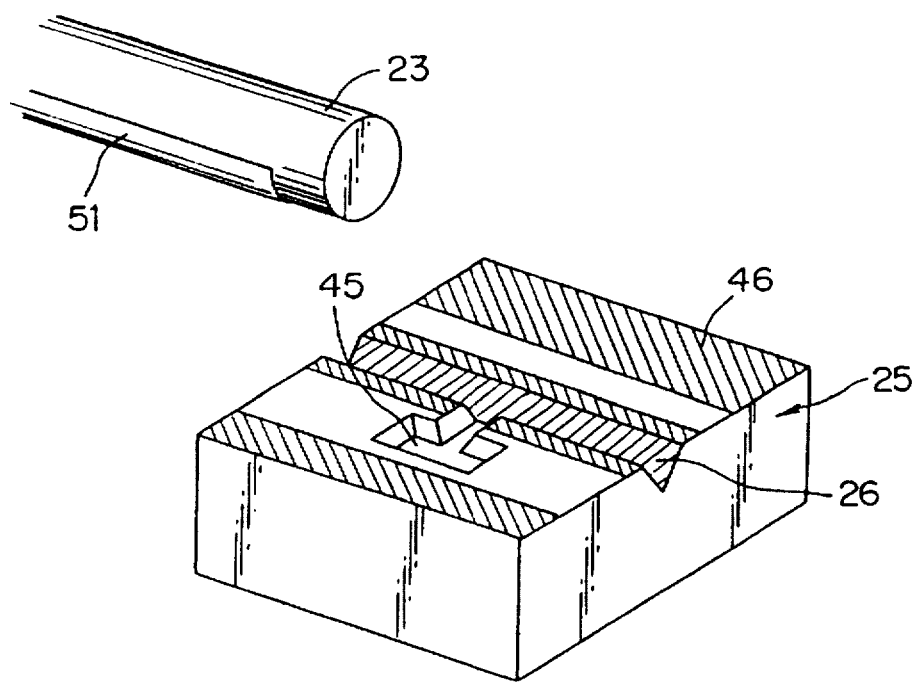
FIG. 28 is a fragmentary perspective view illustrating a procedure of fixing an optical fiber and the fiber block in the first embodiment.

The optical fiber 23, which is metallized (coated with the metal film 51) over about one half the outer periphery of the clad at an end portion thereof by the method described above, is placed in position onto the fiber block 25 using a jig or the like and solder 52 is injected into the flow groove 45 for solder as seen In FIGS. 28 to 30, and the entire fiber block 25 is heated.

When the temperature of the fiber block 25 reaches the dissolution temperature of the solder 52, the solder 52 flows out into the second guide groove 26, and at this point of time, the temperature is lowered. Consequently, the optical fiber 23 and the fiber block 25 are fixed to each other, thereby obtaining the optical fiber 23 with the fiber block 25 as shown in FIG. 30.

After the fiber block 25 and the o)tfcal fiber 23 are fixed to each other in this manner, they are joined to the waveguide substrate 21. Where a bonding agent is used for the fixation, the fiber block 25 is placed onto the waveguide substrate 21 so that the optical fiber 23 is fitted in and closely contacted with the first guide groove 24 of the waveguide substrate 21, and then the bonding agent is flowed through the flow groove into a space between the face portion 21a of the waveguide substrate 21 and the opposing face portion 25a of the fiber block 25 to fixed them.

On the other hand, also where soldering is employed, the fiber block 25 is first placed onto the waveguide substrate 21 so that the optical fiber 23 is fitted in and closely contacted with the first guide groove 24 of the waveguide substrate 21, and then solder 53 is injected into the flow groove, whereafter the entire waveguide substrate 21 is heated until the temperature thereof rises to the dissolving temperature of the solder 53 to fixed the waveguide substrate 21 and the fiber block 25 to each other as shown in FIGS. 31 to 33. Thereupon, the solder 53 spreads between the face portion 21a (metal film 37) of the waveguide substrate 21 and the opposing face portion 25a (metal film 46) of the fiber block 25 to achieve fixation stable in strength.

Here, the melting point (dissolving temperature) of the solder 53 employed for metal fixation between the fiber block 25 and the waveguide substrate 21 is selected lower than the melting point of the solder 52 used for metal fixation between the fiber block 25 and the optical fiber 23. Consequently, such a situation that the solder 52 between the fiber block 25 and the optical fiber 23 fixed by metal fixation to each other precedingly as shown in FIG. 30 is melted by heat for melting the solder 53 used for later metal fixation between the fiber block 25 and the waveguide substrate 21 as shown in FIG. 33 so that the metal fixation condition between the fiber block 25 and the optical fiber 23 is degraded can be prevented.

The face portion 21a of the waveguide substrate 21 and the opposing face portion 25a of the fiber block 25 are fixed to each other in such a manner as described above, and the end portion 22a of the waveguide 22 and the end portion 23a of the optical fiber 23 can be connected and fixed to each other in a condition wherein the core of the waveguide 22 and the core of the optical fiber 23 are aligned accurately with each other.

In this manner according to the first embodiment of the present invention, the position of the optical fiber 23 relative to the waveguide 22 can be determined without any adjustment, and connection and fixation between the waveguide 22 and the optical fiber 23 can be achieved readily with a high degree of accuracy and with a high degree of reliability with a simple structure such that a reduced loss is provided to an optical signal communicated between the waveguide 22 and the optical fiber 23. Further, mass production and reduction in production cost of waveguide circuits can be realized.

c. Second Embodiment

Figure 34:
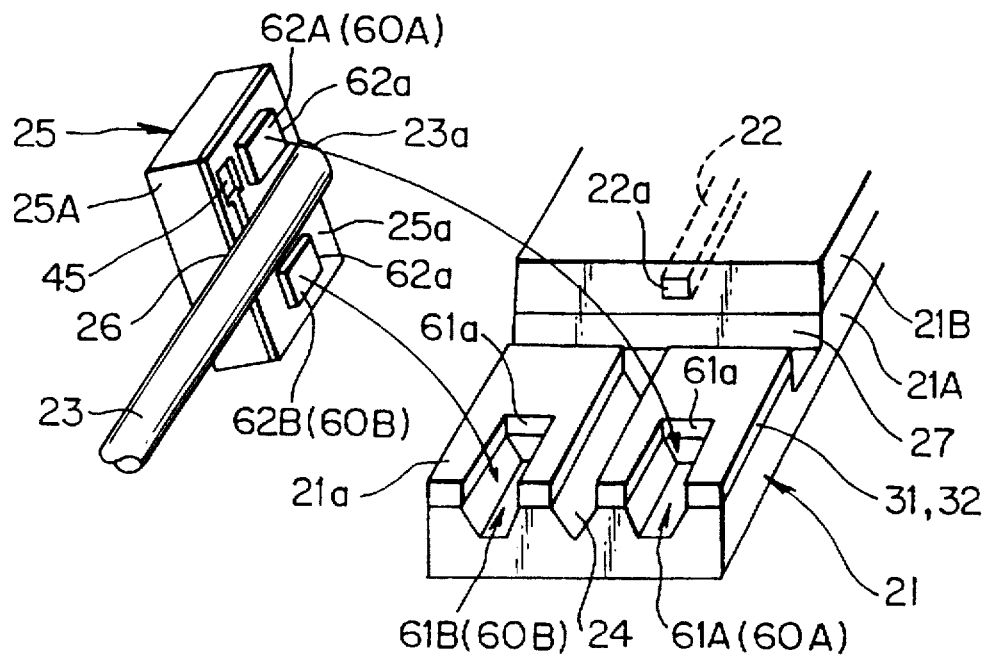
FIG. 34 is an exploded perspective view of another waveguide-optical fiber connection structure showing a second preferred embodiment of the present invention.
Figure 35:
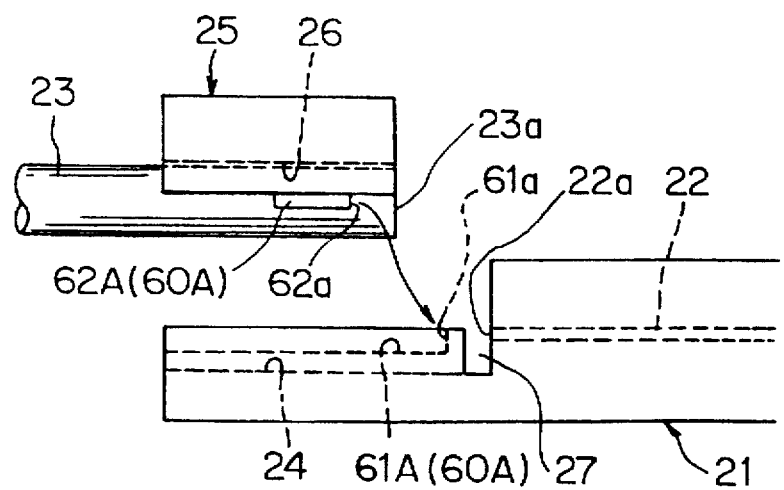
FIG. 35 is a schematic exploded side elevational view of the structure in the second embodiment.

Referring now to FIGS. 34 and 35, there is shown a waveguide-optical fiber connection structure according to a second preferred embodiment of the present invention. The waveguide-optical fiber connection structure of the second embodiment has a substantially similar construction and accordingly is a modification to the waveguide-optical fiber connection of the first embodiment shown in FIG. 5. The waveguide-optical fiber connection structure of the second embodiment, however, is different principally in that a pair of optic axial direction positioning mechanisms 60A and 60B for positioning the optical fiber 23 in the direction of its optic axis are provided on the opposite sides of the guide grooves 24 and 26 (optical fiber 23).

The optic axial direction positioning mechanisms 60A and 60B include a pair of recessed portions 61A and 61B formed on the face portion 21a of the waveguide substrate 21 on the opposite sides of the first guide groove 24 by a procedure hereinafter described with reference to FIGS. 36 to 42, and a pair of projected portions 62A and 62B formed on the face portion 25a of the fiber block 25 on the opposite sides of the second guide groove 26 by another procedure hereinafter described with reference to FIGS. 46 to 51.

Also in the present second embodiment, in order to allow the optical fiber 23 fixed to the fiber block 25 in advance to be fixed such that the outer periphery of the optical fiber 23 closely contacts with the first guide groove 24 on the waveguide substrate 21 while the first guide groove 24 for positioning a fiber is formed with a high degree of accuracy, the optical fiber 23 is located at an optimum position in the X-axis direction and the Y-axis direction (refer to FIG. 35) with respect to the waveguide 22 without any adjustment.

By the way, for positioning of the optical fiber 23 in the direction of its optic axis (Z-axis direction in FIG. 35), since the structure by which the optical fiber 23 is only abutted directly with the waveguide 22 likely damages or increases the loss at the end portion 22a of the waveguide 22 or the end portion 23a of the optical fiber 23 as described hereinabove, in the second embodiment, the optical fiber 23 can be positioned in the direction of its optic axis at a different portion from the optical fiber 23 without directly using the optical fiber 23.

Figure 43:
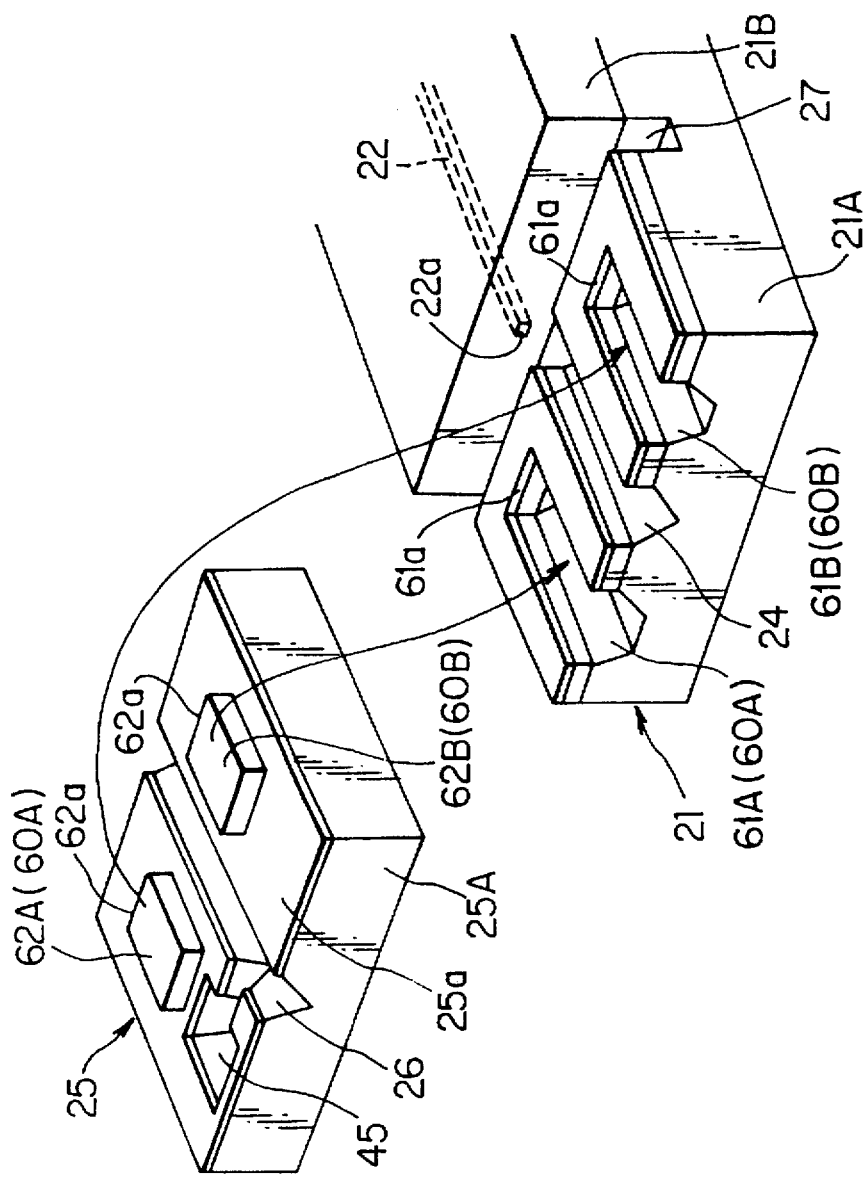
FIG. 43 is an exploded perspective view showing the waveguide substrate and a fiber block in the second embodiment.

In particular, the optical fiber 23 is fixed to the fiber block 25 on which the projected portions 62A and 62B are formed, and in this condition, the projected portions 62A and 62B of the fiber block 25 are fitted into the recessed portions 61A and 61B of the waveguide substrate 21, respectively, as shown in FIGS. 34, 35 and 43 and end faces 61a of the recessed portions 61A and 61B and end faces 62a of the projected portions 62A and 62B are abutted with each other, respectively.

Consequently, the optical fiber 23 can be located at an optimum position in the direction of the optic axis thereof without any adjustment. Accordingly, with the waveguide-optical fiber connection structure of the second embodiment of the present invention, such a situation that the optical fiber 23 is pressed excessively strongly against the waveguide 22 to damage the end portion 22a of the waveguide 22 or the end portion 23a of the optical fiber 23 or to curve the optical fiber 23 itself, which makes a factor of an increase of the loss, can be prevented. Further, similarly as in the first embodiment, the waveguide 22 and the optical fiber 23 can be connected and fixed to each other readily with a high degree of accuracy and with a high degree of reliability with a simple structure such that an optical signal can be communicated at a low loss between them, which contributes to mass production and reduction in production cost of waveguide circuits.

Subsequently, a procedure of producing the waveguide substrate 21 having the recessed portions 61A and 61B, which is employed in the second embodiment, will be described with reference to FIGS. 36 to 42. First, as shown in FIG. 36, a low refraction index layer (lower clad layer) 31 and a high refraction index layer (core layer) 32 are deposited, for example, by a flame deposition method or a CVD method on a Si substrate 21A of the crystal face of 100 on which a first guide groove 24 of a V-shaped cross section and a pair of recessed portions 61A and 61B are to be formed.

Figure 37:
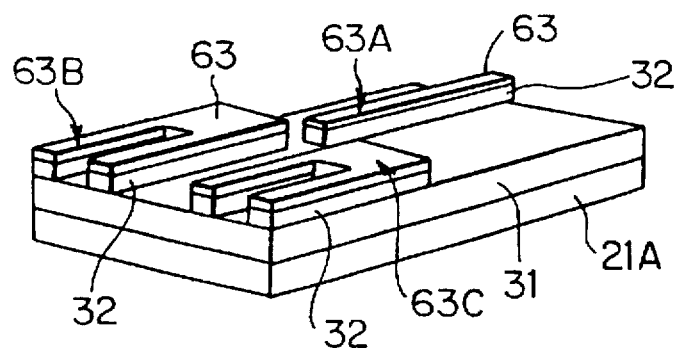

Then, mask patterns (mask members) 63A, 63B and 63C are formed from a film of Si, Cu or some other suitable material partially on the low refraction index layer 31 as shown in FIG. 37. It is to be noted that, in the second embodiment, a Si film 63 is formed as a mask pattern.

Figure 36:
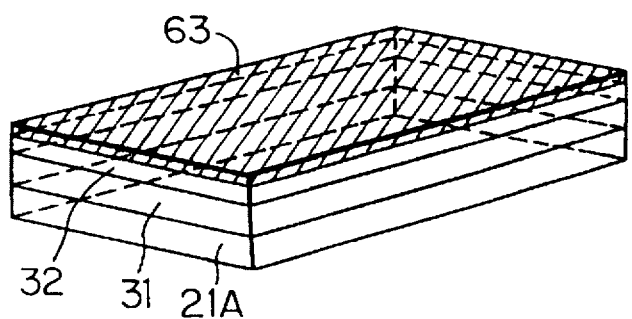
FIGS. 36 to 42 are schematic perspective views illustrating different steps of a process of producing a waveguide substrate in the second embodiment.

In this instance, by vapor depositing the mask pattern (Si film) 63 on the low refraction index layer 31 by EB vapor deposition, sputtering or the like as shown in FIG. 36 and then performing a same photo-lithographic mask processing+etching step (RIE or the like) similarly as in the first embodiment, the mask pattern 63A for formation of a waveguide and the mask patterns 63B and 63C for formation of a guide groove and recessed portions are formed in a condition wherein they are positioned with a high degree of accuracy. In other words, a portion of the low refraction index layer 31 covered with the mask pattern 63A makes a waveguide formation area in which a waveguide is to be formed. Further, a pre-mask pattern for formation of a first guide groove of a V-shaped cross section and pre-mask patterns for formation of a pair of recessed portions on the opposite sides of the first guide group are formed by the mask patterns 63B and 63C on an extension line of the waveguide formation area.

Then, the other portion of the high refraction index layer 32 on which the mask patterns 63A to 63C are not formed is etched as shown in FIG. 37 using a RIE equipment or the like. As a result of the etching, the core portion (waveguide) 22 and the primary mask pattern (only high refraction index layer) for formation of a guide wave and recessed portions on an extension line of the waveguide 22 are formed.

Figure 38:
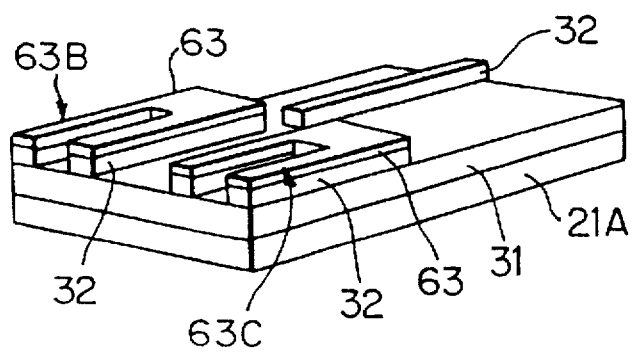

Here, where the mask pattern 63A is present on the waveguide 22, light propagating along the waveguide 22 is absorbed by the mask pattern 63A, and accordingly, only the mask patterns 63B and 63C in the guide groove formation areas are protected while only the mask pattern 63A on the waveguide 22 is removed as shown in FIG. 38 by multiple exposure or some other suitable means.

Figure 39:
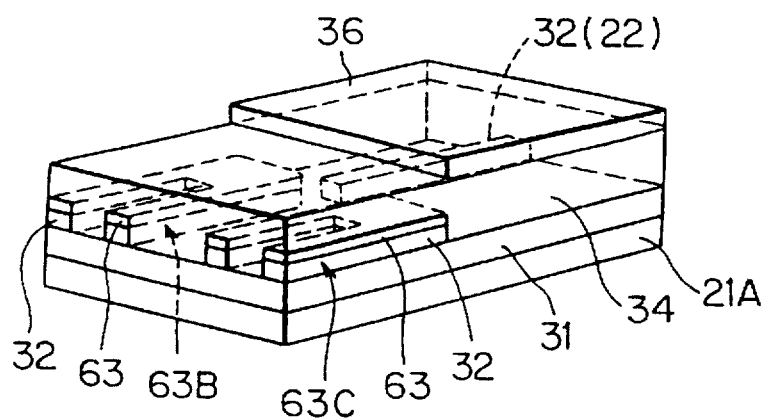

In the condition shown in FIG. 38, a low refraction index layer (upper clad layer, upper low refraction index layer) 34 is formed over the entire area with the thickness of approximately 20 μm as shown in FIG. 39, for example, by a CVD method. In this instance, the low refraction index layer 34 is formed leaving the mask patterns 63B and 63C for formation of a guide groove and recessed portions.

Then, a mask material (Si film) similar to that described hereinabove with reference to FIG. 36 is deposited on the areas of the low refraction index layers 34 and 31 including the waveguide (core portion) 22 and patterned to form a mask 36 so that the areas may be protected against etching (RIE or the like) as shown in FIG. 39. The film thickness of the mask 36 used here may be approximately 5 μm.

Figure 40:
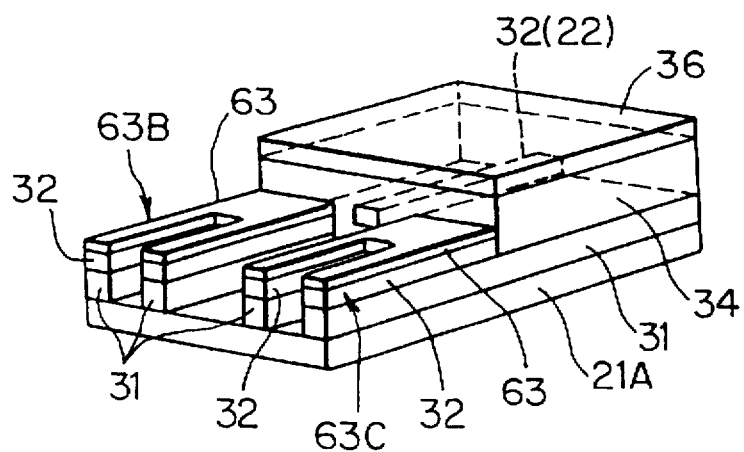

Further, etching is performed by means of a RIE equipment or the like while the areas of the low refraction index layers 34 and 31 including the waveguide (core portion) 22 remain protected by the mask 36 until the Si substrate 21A (crystal face: 100) in the guide groove formation portion is exposed as shown in FIG. 40.

In this instance, since the areas of the low refraction index layers 34 and 31 including the waveguide (core portion) 22 are protected with the metal mask 36, they are not etched. Also for the guide groove formation portion, the mask patterns 63B and 63C left at the preceding step serve as stoppers against etching so that a guide groove etching mask for a guide groove and recessed portions having a film thickness corresponding to the core (waveguide 22)+lower clad layer (low refraction index layer 31) is formed finally. Thereafter, the mask patterns 63B and 63C are removed.

Figure 41:
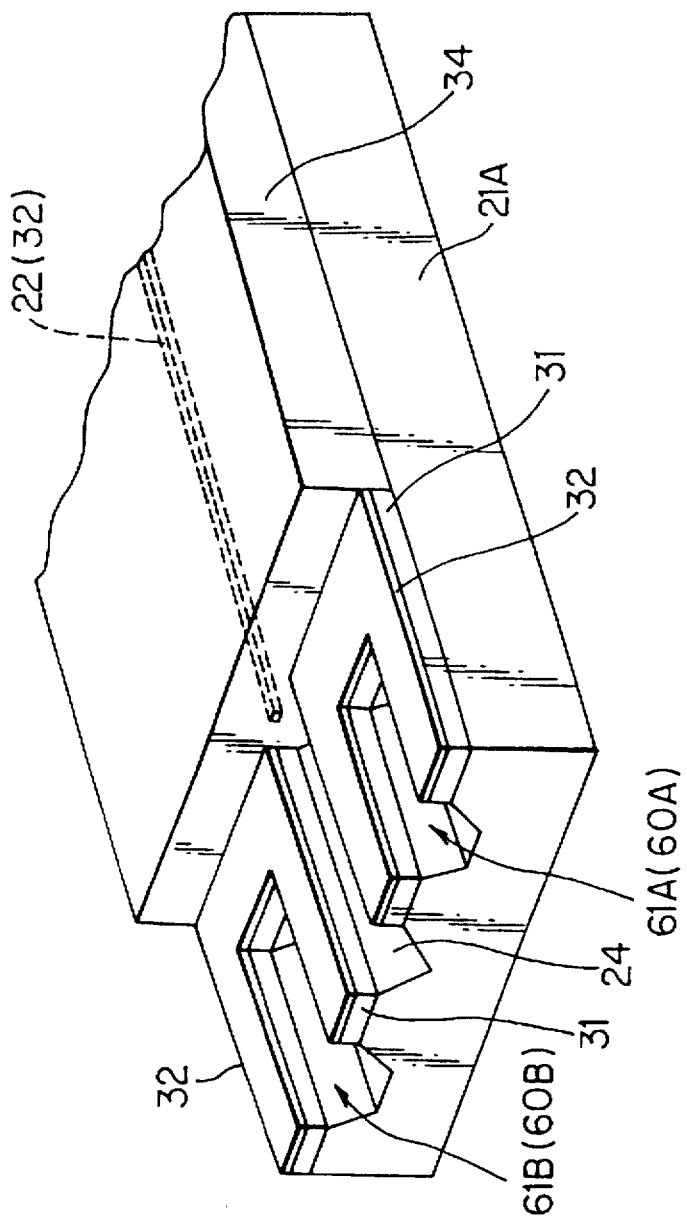

Thereafter, using the etching mask (low refraction index layer 31 and high refraction index layer 32) for formation of a guide groove and recessed portions having the thickness of the core+lower clad layer formed in such a manner as shown in FIG. 40, wet etching (anisotropic etching) is performed to form a first guide groove 24 at an exposed portion of the Si substrate 21A as shown in FIG. 41 and form, on the opposite sides of the first guide groove 24, a pair of recessed portions 61A and 61B which function as the optic axial direction positioning mechanisms 60A and 60B.

Here, while the mask patterns (low refraction index layer 31 and high refraction index layer 32) for formation of a guide groove and recessed portions in the first embodiment are removed using hydrofluoric acid or some other suitable material, in the second embodiment, the mask patterns are left as they are and the mask patterns themselves are used as the optic axial direction positioning mechanisms 60A and 60B.

Figure 42:
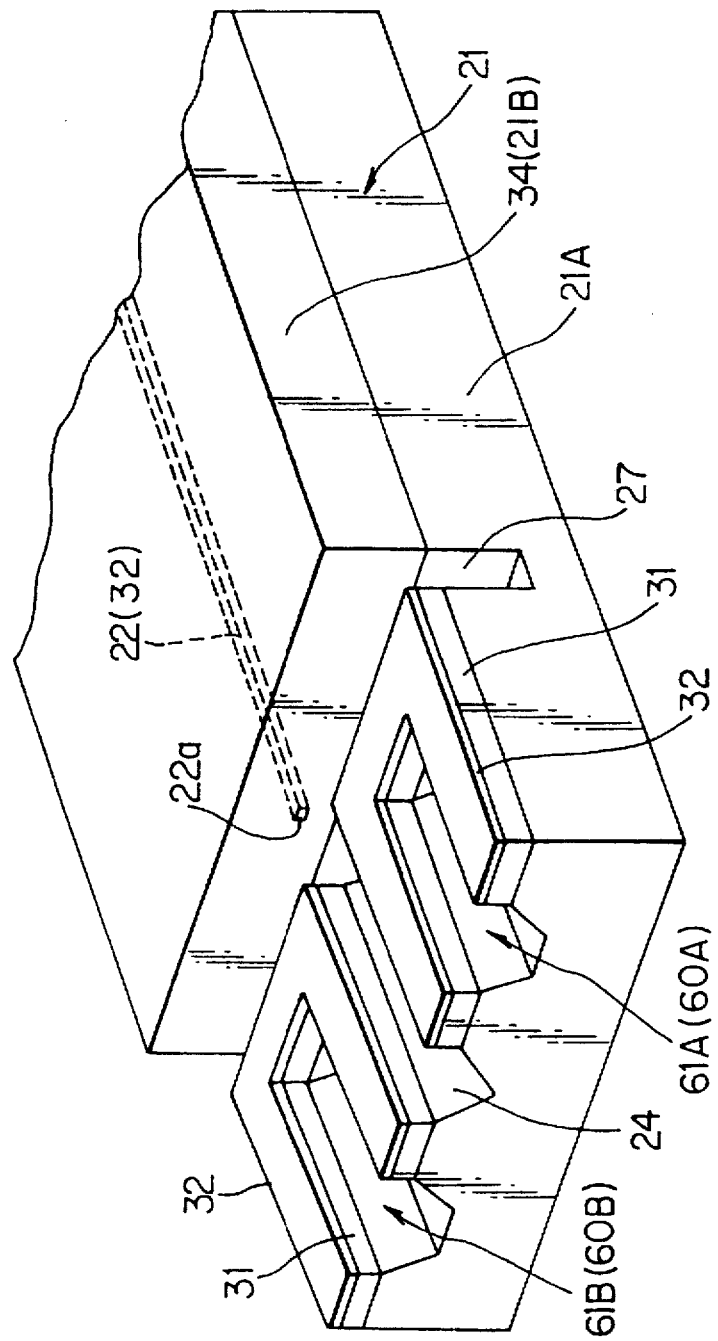

Thereafter, formation of an end face (formation of a mirror face) of the waveguide (core portion) 22 is performed using a precision cutting saw (dicing saw) to form a cut groove 27 between the waveguide 21 and the first guide groove 24 as shown in FIG. 42. Where such cut groove 27 is provided, an obstacle, etching waste or the lice produced at a boundary portion between the waveguide 22 and the first guide groove 24 can be removed by way of the cut groove 27 similarly as in the first embodiment.

Meanwhile, projected portions 62A and 62B which function as the optic axial direction positioning mechanisms 60A and 60B are formed on the face portion 25a of the fiber block 25 in a similar procedure to the procedure of production of a modified fiber block which will be hereinafter described with reference to FIGS. 46 to 51. It is to be noted that also the second guide groove 26 and the flow groove 45 for solder which communicates with the second guide groove 26 are formed simultaneously with the projected portions 62A and 62B on the fiber block 25 in a similar manner as in the first embodiment.

Further, similarly as in the first embodiment, a metal film is formed at an end portion (outer periphery of the clad) of the optical fiber 23, the insides and the circumferences of the second guide groove 26 and the flow groove 45 for solder, the face portion 21a of the waveguide substrate 21 and the face portion 25a of the fiber block 25 to be joined to the face portion 21a so that the waveguide substrate 21, the optical fiber 23 and the fiber block 25 may be fixed to each other by metal fixation by soldering.

Then, also in the second embodiment, the optical fiber 23 is fixed, similarly as in the first embodiment, by metal fixation to the fiber block 25 in accordance with the procedure described hereinabove with reference to FIGS. 28 to 30.

Thereafter, the projected portions 62A and 62B of the fiber block 25 are fitted into the recessed portions 61A and 61B of the waveguide substrate 21 as described hereinabove with reference to FIGS. 34, 35 and 43, and then the fiber block 25 is moved toward the waveguide 22 until the end faces 61a of the recessed portions 61A and 61B and the end faces 62a of the projected portions 62A and 62B are abutted with each other, respectively.

Consequently, the optical fiber 23 is located at an optimum position with respect to the waveguide 22 in the X-axis direction and the Y-axis direction as well as the direction of the optic axis without any adjustment. Then, similarly as in the first embodiment, the face portion 21a of the waveguide substrate 21 and the opposing face portion 25a of the fiber block 25 are fixed by metal fixation to each other as described hereinabove with reference to FIG. 33.

It is to be noted that, while, in the second embodiment described above, the recessed portions 61A and 61B are formed on the waveguide substrate 21 and the projected portions 62A and 62B are formed on the fiber block 25, alternatively the projected portions may be formed on the waveguide substrate 21 with the recessed portions formed on the fiber block 25.

Figure 44:
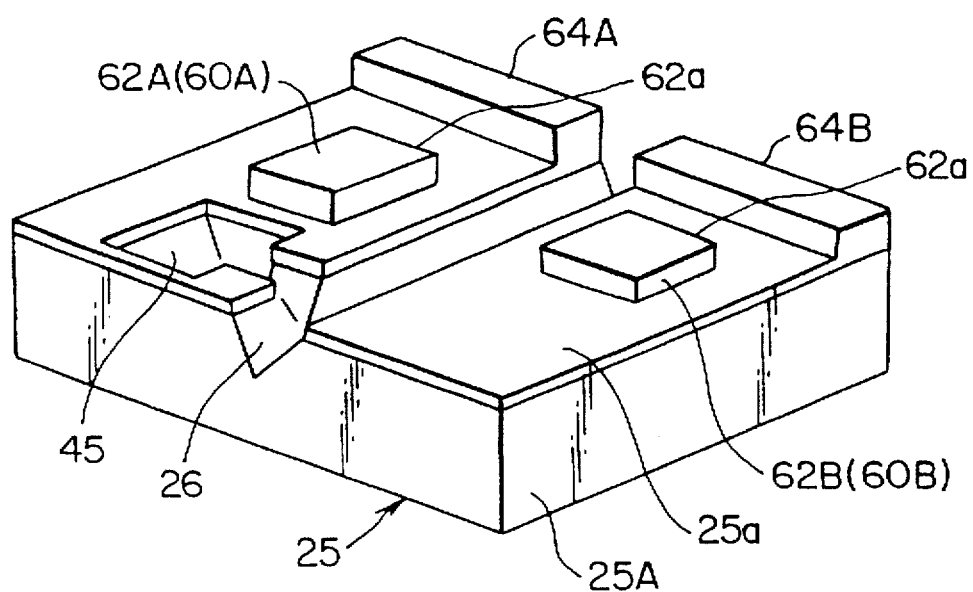
FIG. 44 is a perspective view showing a modification to the fiber block in the second embodiment.
Figure 45:
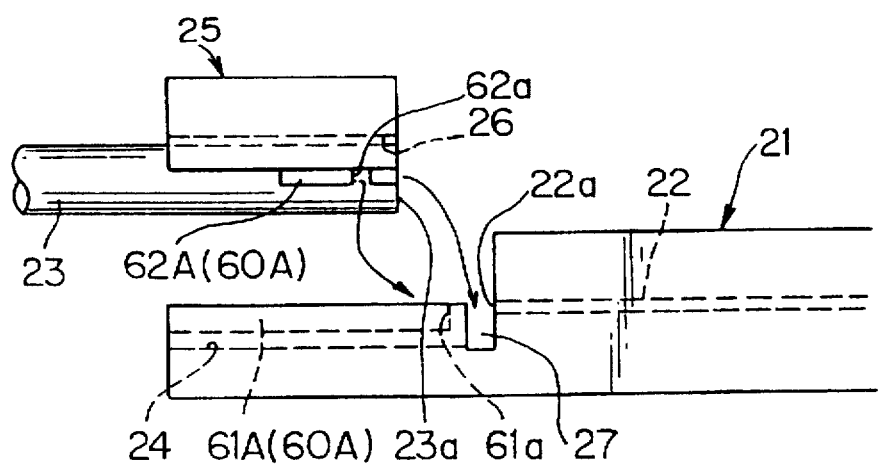
FIG. 45 is an exploded side elevational view showing a waveguide-optical fiber connection structure in which the modified fiber block shown in FIG. 44 is employed.

Further, while the fiber block 25 shown in FIGS. 34, 35 and 43 has only the projected portions 62A and 62B formed thereon for fitting in the recessed portions 61A and 61B of the waveguide substrate 21, respectively, the fiber block 25 may have, in addition to the projected portions 62A and 62B, for example, another pair of projected portions 64A and 64B formed on the opposite sides of the second guide groove 26 thereon for fitting in the cut groove (dicing groove) 27 of the waveguide substrate 21 as shown in FIGS. 44 and 45.

When the fiber block 25 on which the optical fiber 23 is held is mounted onto the waveguide substrate 21, the projected portions 64A and 64B are fitted into the cut groove 27 of the waveguide substrate 21 so that they function as an optic axis direction positioning mechanism for positioning the optical fiber 23 in the direction of its optic axis together with the projected portions 62A and 62B.

A similar effect to that described above can be obtained even if another fiber block which only has the projected portions 64A and 64B in place of the projected portions 62A and 62B is employed. However, where the fiber block 25 having both of the projected portions 62A and 62B and the projected portions 64A and 64B is employed, the alignment area can be assured great and the reliability in positional adjustment is enhanced, and besides, adhesion is facilitated.

Figure 46:
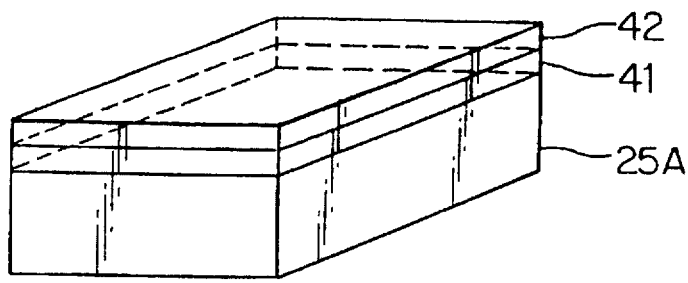
FIGS. 46 to 51 are perspective views illustrating different steps of a process of producing the modified fiber block shown in FIG. 44.

Here, a process of producing the fiber block 25 having both of the projected portions 62A and 62B and the projected portions 64A and 64B described hereinabove with reference to FIGS. 44 and 45 will be described with reference to FIGS. 46 to 51. First, similarly as in the first embodiment illustrated in FIG. 19, a $SiO_2$ layer 41 is deposited on a Si substrate 25A of the crystal face of 100 on which the second guide groove 26 of a V-shaped cross section and the projected portions 62A, 62B, 64A and 64B are to be formed, and then a Si layer is deposited as a mask material 42 on the $SiO_2$ layer 41 by vapor deposition as shown in FIG. 46.

Figure 47:
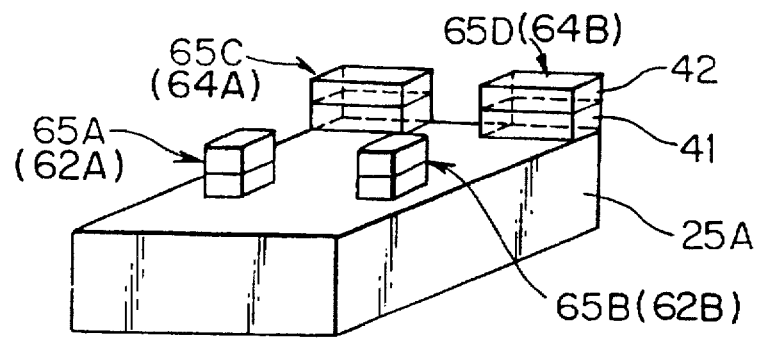

Then, a same photo-lithographic mask processing +etching step (RIE or the like) is performed to form mask patterns 65A to 65D of the mask material 42 for formation of projected portions in a highly accurately positioned condition, and then a portion of the $SiO_2$ layer 41 on which the mask patterns 65A to 65D are not formed is etched using a RIE equipment or the like as shown in FIG. 47 As a result of the etching, projected portions 62A, 62B, 64A and 64B including the SiO₂ layer 41 and the mask patterns 65A to 65D are formed.

Figure 48:
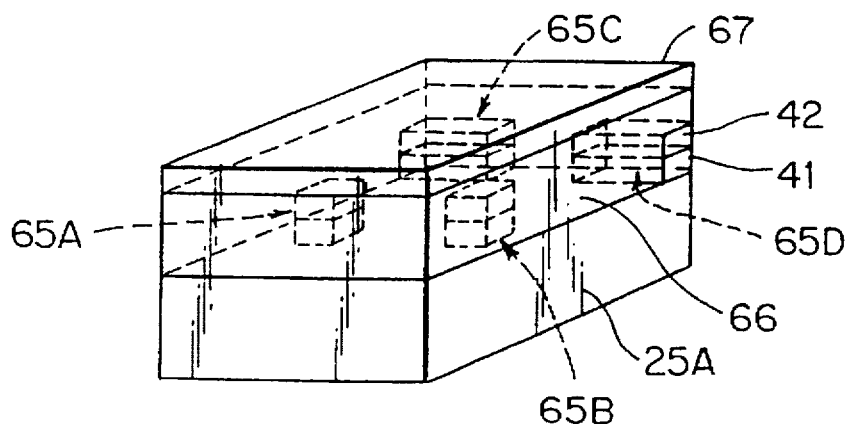

Subsequently, in order to form the second guide groove 26 on the fiber block 25, a SiO₂ layer 66 is deposited over the entire area as shown in FIG. 48, and then a Si layer is deposited as a mask member 67 by vapor deposition.

Figure 49:
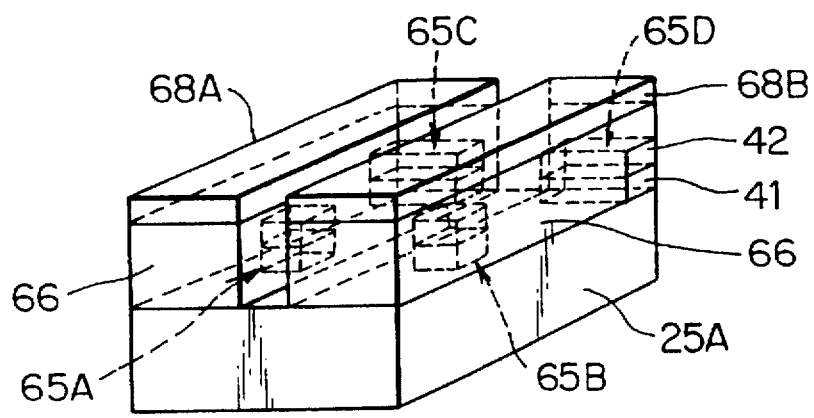

Then, a same photo-lithographic mask processing +etching step (RIE or the like) is performed to form mask patterns 68A and 68B for formation of a guide groove in a very accurately positioned condition as shown in FIG. 49, and then a portion of the SiO₂ layer 66 on which the mask patterns 68A and 68B are not formed is etched by means of a RIE equipment or the like until the Si substrate 25A at the guide groove formation portion is exposed. In this instance, since the areas of the projected portions 62A, 62B, 64A and 64B are protected with the mask patterns 68A and 68B, they are not etched.

Figure 50:
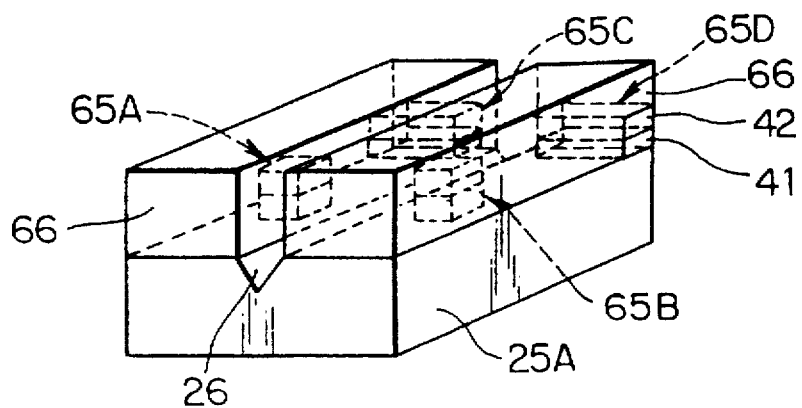

Thereafter, the mask patterns 68A and 68B are removed, and wet etching (anisotropic etching) is performed using the remaining SiO₂ layer 66 as a guide groove etching mask to form a second guide groove 26 at the exposed portion of the Si substrate 25A as shown in FIG. 50, whereafter etching is performed by means of a RIE equipment until the Si substrate 25A is exposed.

Figure 51:
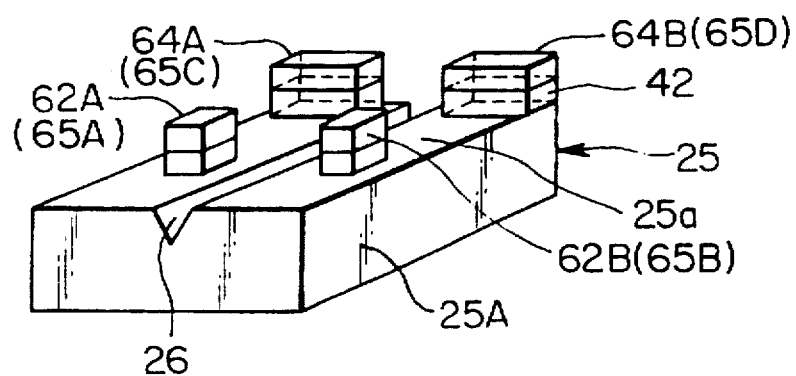

Consequently, only the portions protected with the mask patterns 65A to 65D remain, and the projected portions 62A, 62B, 64A and 64B formed from the SiO₂ layer 41 and the mask patterns 65A to 65D and the fiber block 25 having the second guide groove 26 of a V-shaped cross section are produced as shown in FIG. 51.

It is to be noted that, if the mask patterns 65C and 65D in FIG. 47 are not formed in the procedure of production of the fiber block 25 described hereinabove with reference to FIGS. 46 to 51, the projected portions 64A and 64B are not formed, but another fiber block having such projected portions 62A and 62B as shown in FIGS. 34, 35 and 43 is produced.

Further, though not shown in FIGS. 46 to 51, the flow groove 45 for solder shown in FIG. 45 can be formed simultaneously with formation of the second guide groove 26 in accordance with the quite same procedure as the procedure of formation of the second guide groove 26.

Figure 52:
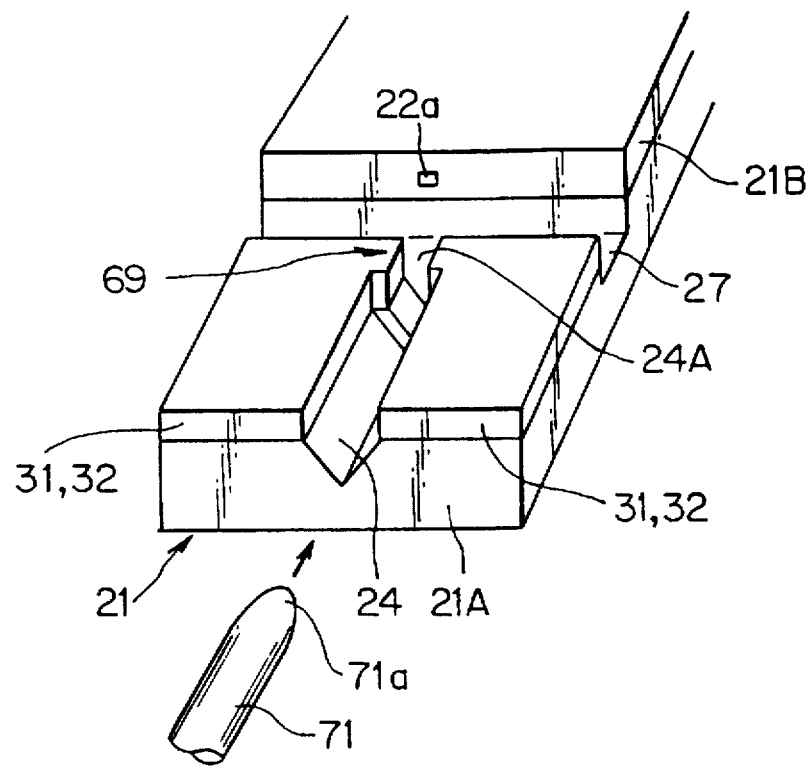
FIG. 52 is a perspective view showing a first modification to the waveguide substrate shown in the second embodiment.
Figure 54:
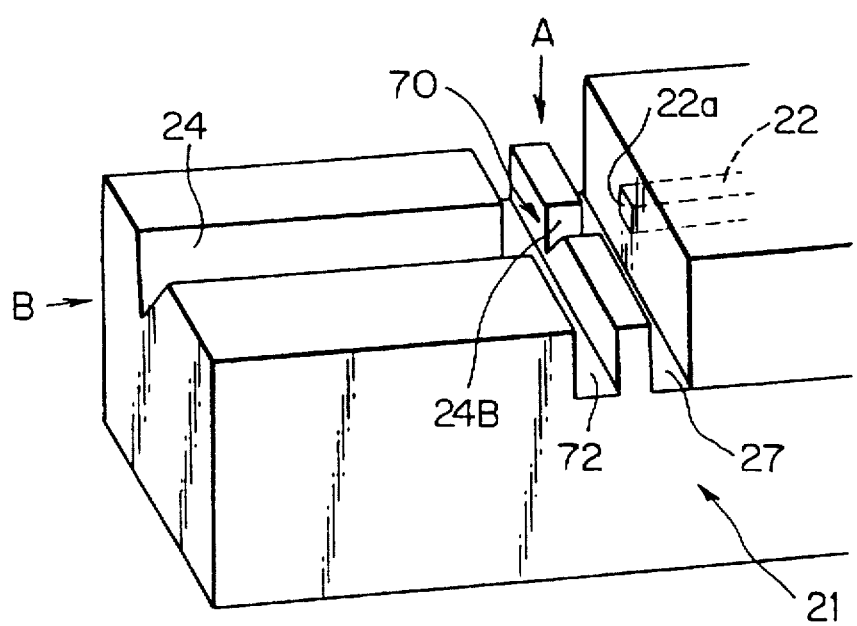
FIG. 54 is a perspective view showing a second modification to the waveguide substrate in the second embodiment.

In the meantime, while, in the embodiment described above, the optic axial direction positioning mechanisms 60A and 60B are constituted from the recessed portions 61A and 61B and the projected portions 62A, 62B, 64A and 64B, where an optical fiber to be connected to the waveguide 22 is a tapered spherically ended optical fiber, the concave and convex portions described above may be replaced by an optic axial direction positioning mechanism 69 or 70 of such a construction as shown, for example, in FIG. 52 or 54, and also in this instance, similar effects to those described above can be achieved. However, where the optic axial direction positioning mechanism 69 or 70 is employed, such a fiber block 25 (employed in the first embodiment) having no projected portion as shown in FIG. 22 is employed.

Further, the optic axial direction positioning mechanism 69 shown in FIG. 52 is constructed as a groove portion 24A formed at the end portion of the first guide groove 24 adjacent the waveguide and having a smaller width than the first guide groove 24. The groove portion 24A of such construction can be formed readily, for example, by modifying the shapes of the mask patterns 33B and 33C (refer to FIG. 13) employed for production of the waveguide substrate 21 in the first embodiment such that the end portions adjacent the waveguide may have a width reduced in accordance with the width of the groove portion 24A.

It is to be noted that, with the waveguide substrate 21 shown in FIG. 52, the mask patterns (low refraction index layer 31 and high refraction index layer 32) for formation of a guide groove and recessed portions are left as they are so that they are used as the groove portion 24A of a small width similarly as in the second embodiment described hereinabove with reference to FIGS. 34 to 43.

In the construction described above, similarly as in the first and second embodiments, while a tapered spherically ended optical fiber 71 is held by the fiber block 25 (not shown in FIGS. 52 and 53), the tapered spherically ended optical fiber 71 is fitted into the first guide groove 24 of the waveguide substrate 21 to position the tapered spherically ended optical fiber 71 in the X-axis direction and the Y-axis direction with respect to the waveguide 22.

Figure 53:
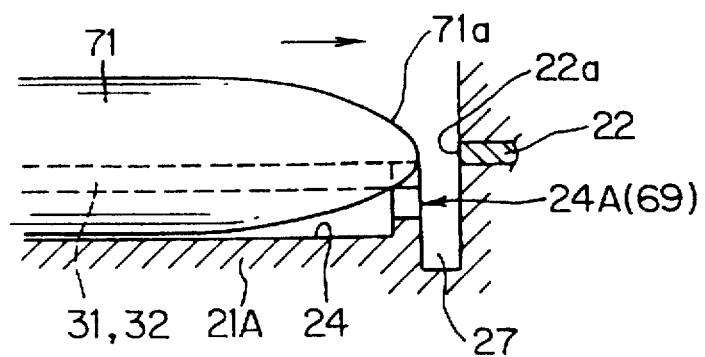
FIG. 53 is a side elevational sectional view showing the arrangement of an optical fiber on the modified waveguide substrate shown in FIG. 52.

Simultaneously, the tapered spherically ended optical fiber 71 is moved toward the waveguide 22 (in the rightward direction in FIG. 53) together with the fiber block 25 until an end portion 71a of the tapered spherically ended optical fiber 71 is abutted with the groove portion 24A serving as the optic axial direction positioning mechanism 69 as shown in FIG. 53 to position the tapered spherically ended optical fiber 71 in the direction of its optic axis (Z-axis direction).

Consequently, the tapered spherically ended optical fiber 71 can be located at an optimum position in the direction of its optic axis without any adjustment. Particularly, where a distance is required between the tapered spherically ended optical fiber 71 and the waveguide 22, the tapered spherically ended optical fiber 71 can be positioned accurately with certainty without interfering with advancement of the optical path of the tapered spherically ended optical fiber 71 and without damaging the end portion 22a of the waveguide 22 or the end portion 71a of the tapered spherically ended optical fiber 71.

Figure 55:
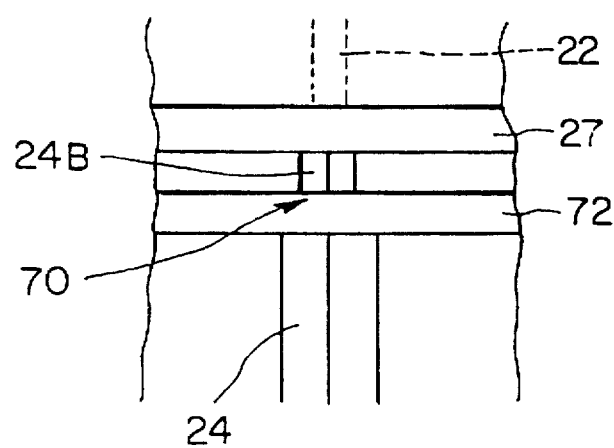
FIG. 55 is a partial enlarged view of a portion of the modified waveguide substrate of FIG. 54 as viewed in the direction indicated by an arrow mark A.
Figure 56:
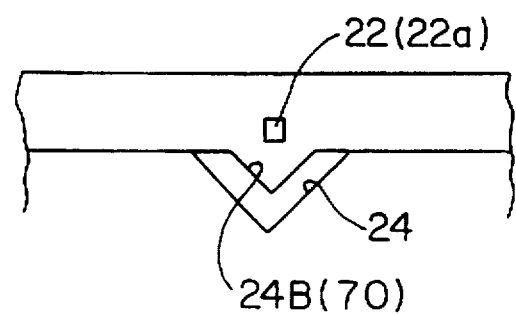
FIG. 56 is a a partial enlarged view of another portion of the modified waveguide substrate of FIG. 54 as viewed in the direction indicated by another arrow mark B.

The optic axial direction positioning mechanism 70 shown in FIGS. 54 to 56 is constructed as a groove portion 24B of a V-shaped cross section formed at the end portion of the first guide groove 24 adjacent the waveguide and having a width smaller than the first guide groove 24. It is to be noted that a cut groove (dicing groove) 27 is formed between the groove portion 24B and the waveguide 22 similarly as in the first and second embodiments and another cut (dicing groove) 72 is formed also between the first guide groove 24 and the groove portion 24B.

Such groove portion 24B is formed in the following manner. In particular, the first guide groove 24 and the groove portion 24B are first formed in a similar manner to that of the optic axial direction positioning mechanism 69 shown in FIG. 52, and then the mask patterns (low refraction index layer 31 and high refraction index layer 32) for formation of a guide groove are removed by means of hydrofluoric acid or the like similarly as in the first embodiment.

Then, using a precision cutting saw (dicing saw), a cut groove 27 is formed between the groove portion 24B and the waveguide 22 to form an end face of the waveguide 22, and another cut groove 72 is formed also between the groove portion 24B and the first guide groove 24. Where such cut grooves 27 and 72 are formed, an obstacle, etching waste or the like produced at boundary portions between the waveguide 22 and the first guide groove 24 and between the first guide groove 24 and the groove portion 24B can be removed by way of the cut grooves 27 and 72.

As described above, the groove portion 24B of a V-shaped cross section having a smaller width and a smaller depth than the first guide groove 24 is formed as the optic axial direction positioning mechanism 70 between the first guide groove 24 and the waveguide 22 as shown in FIGS. 55 and 56.

Figure 57:
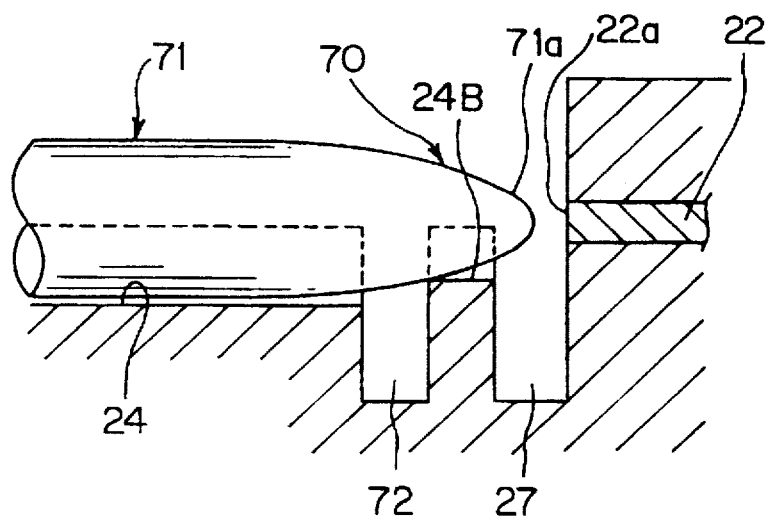
FIG. 57 is a side elevational sectional view showing the arrangement of an optical fiber on the modified waveguide substrate shown in FIG. 54.

Accordingly, similarly to the optic axial direction positioning mechanism 69 described hereinabove with reference to FIGS. 52 and 53, by abutting the end portion 71a of the tapered spherically ended optical fiber 71 with the groove portion 24B serving as the optic axial direction positioning mechanism 70 as shown in FIG. 57, the tapered spherically ended optical fiber 71 can be located at an optimum position in the direction of its optic axis without any adjust without interference with advancement of the optical path of the tapered spherically ended optical fiber 71 and without damaging the end portion 22a of the waveguide 22 or the end portion 71a of the tapered spherically ended optical fiber 71.

d. Third Embodiment

Figure 58:
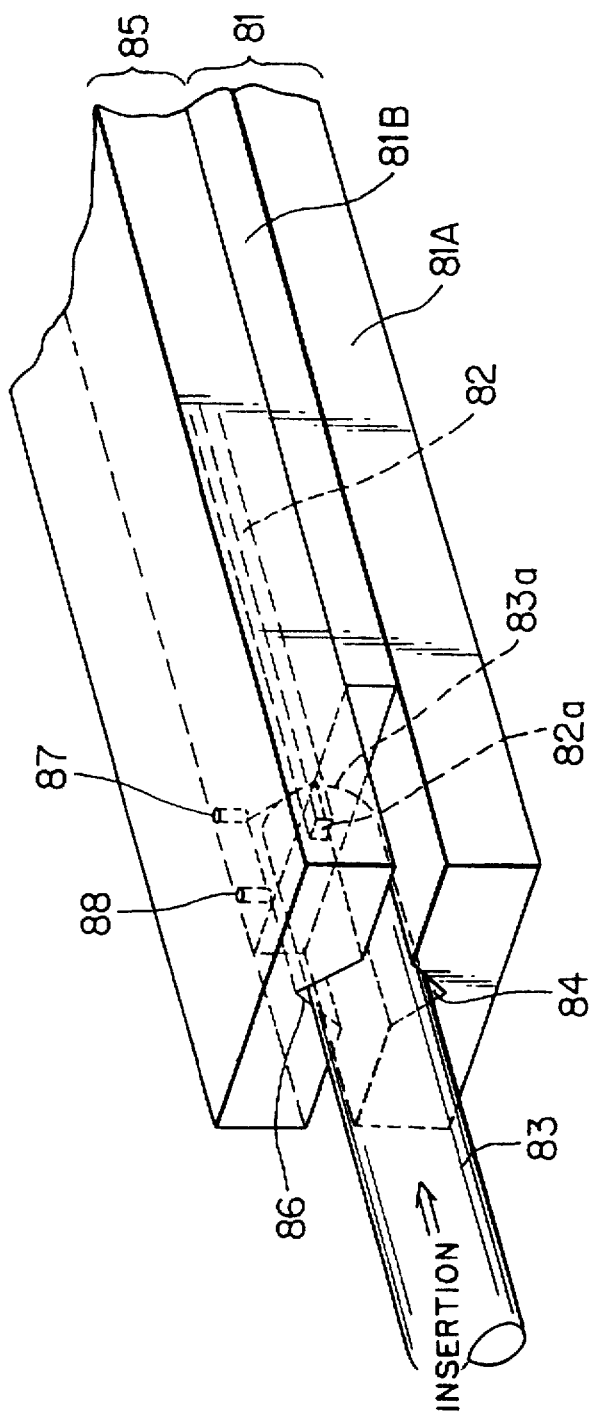
FIG. 58 is a perspective view of a further waveguide-optical fiber connection structure showing a third preferred embodiment of the present invention.

Referring now to FIG. 58, there is shown a waveguide-optical fiber connection structure according to a third preferred embodiment of the present invention. The waveguide-optical fiber confection structure shown includes a waveguide substrate 81 which includes a silicon substrate (Si substrate) 81A forming a substrate body of the waveguide substrate 81 and a $SiO_2$ (quartz) layer 81B on which a waveguide (core portion) 82 is formed. A first guide groove 84 of a V-shaped cross section for positioning an optical fiber 83 is formed on the silicon substrate 81A on an extension line of an optic axis of the waveguide 82 adjacent an end portion (end face) 82a of the waveguide 82 similarly as in the first and second embodiments.

The waveguide-optical fiber connection structure further includes a fiber substrate 85, which is in the form of a silicon substrate formed and located in an opposing relationship to the silicon substrate 81A across the $SiO_2$ layer 81B. A second guide groove 86 of a V-shaped cross section for positioning the optical fiber 83 is formed at an end portion of the fiber substrate 85, and the fiber substrate 85 is fixed to the waveguide substrate 81 ($SiO_2$ layer 81B), for example, by anode joining (which will be hereinafter described) with the second guide groove 86 opposed to the first guide groove 84.

Thus, by inserting and fixing the optical fiber 83 between the waveguide substrate 81 (silicon substrate 81A) and the fiber substrate 85 along the first guide groove 84 and the second guide groove 86, the end portion (end face) 82a of the waveguide 82 and an end portion (end face) 83a of the optical fiber 83 are connected to each other.

It is to be noted that, in FIG. 58, reference numeral 87 denotes a first communication path (communication hole) formed in the fiber substrate 85 in such a manner as to communicate with a space (in the second guide groove 86) between the end portion 82a of the waveguide 82 and the end portion 83a of the optical fiber 83, and 88 a second communication path (communication hole) formed in the fiber substrate 85 in such a manner as to communicate with a portion in the proximity of a central portion in the longitudinal direction of the second guide groove 86. The techniques for formation and the functions of the first communication path 87 and the second communication path 88 will be hereinafter described.

Figure 59:
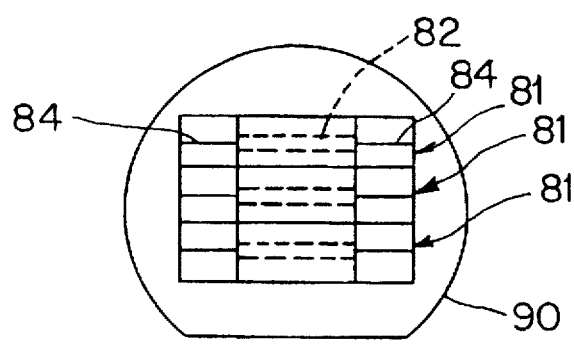
FIG. 59 is a plan view showing a silicon wafer used for production of a waveguide substrate in the third embodiment.
Figure 60:
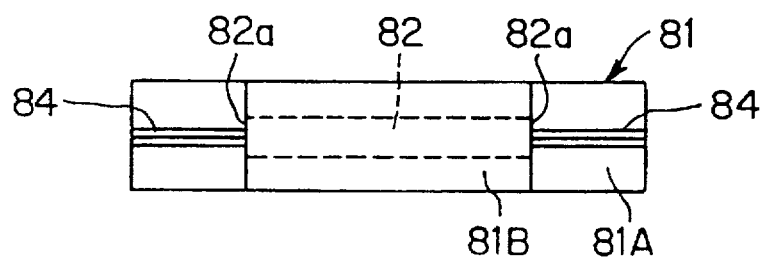
FIG. 60 is a plan view showing the waveguide substrate in the third embodiment.
Figure 61:
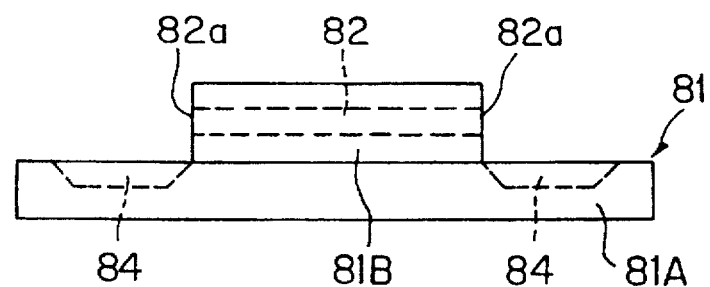
FIG. 61 is a side elevational view showing the waveguide substrate in the third embodiment.

By the way, as shown, for example, in FIG. 59, the waveguide substrate 81 is formed by a plural number (three in FIG. 59) at a time on a silicon wafer 90, and such a waveguide substrate 81 as shown in FIGS. 60 and 61 is obtained by cutting each of the waveguide substrates 81 from the silicon wafer 90 into a chip.

The technique of producing the waveguide substrates 81 on the silicon wafer 90 is quite similar to the procedure used to produce the waveguide substrate 21 in the first or second embodiment, and the quartz waveguide 82, the first guide groove 84 of a V-shaped cross section and so forth are formed on the silicon wafer 90 by photo-lithography or etching. It is to be noted that the waveguide substrate 81 in the present embodiment is formed such that is has a pair of such first guide grooves 84 on the opposite sides of the waveguide 82 as shown in FIGS. 59 to 61.

Figure 62:
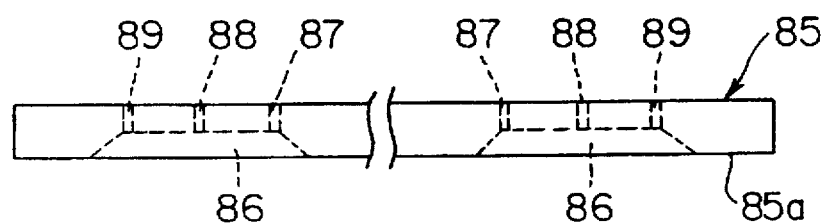
FIG. 62 is a plan view showing an optical fiber in the third embodiment.
Figure 63:
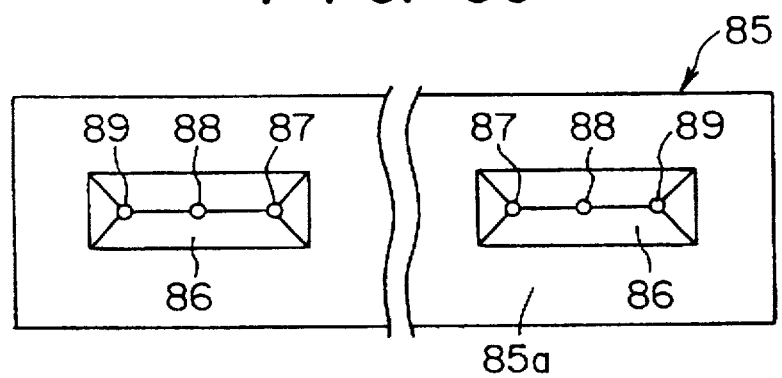
FIG. 63 is a side elevational view showing the optical fiber in the third embodiment.

Also the fiber substrate 85 is formed on a silicon wafer (not shown) similarly to the waveguide substrate 81, and such a fiber substrate 85 as shown in FIGS. 62 and 63 is obtained by cutting the silicon wafer into a chip. The technique of producing the fiber substrate 85 on the silicon wafer is similar to the procedure used to produce the fiber block 25 in the first or second embodiment, and a pair of second guide grooves 86 of a V-shaped cross section are formed on the silicon wafer by photo-lithography, etching or the like.

It is to be noted that such flow groove 45 for solder as in the first or second embodiment is formed is not formed on the fiber substrate 85 in the third embodiment, but a first communication path 87, a second communication path 88 and a third communication path 89 are formed in an equally spaced relationship from each other in the longitudinal direction of the second guide grooves 86 for each of the second guide grooves 86 as shown in FIGS. 62 and 63.

The communication paths 87, 88 and 89 are formed as holes by means of an excimer laser or by wet etching or mechanical working (micro-drilling) or the like such that they extend from the rear face to the face of the fiber substrate 85 (the face remote from the face on which the second guide grooves 86 are formed) to the second guide grooves 86 as shown in FIG. 63.

It is to be noted that the fiber substrate 85 in the present embodiment is constructed such that, as shown in FIGS. 62 and 63, it has a flat face portion 85A to be contacted with and fixed to the $SiO_2$ layer 81B of the waveguide substrate 81 and has the second guide grooves 86 and the communication paths 87 to 89 adjacent the opposite ends of the flat face portion 85A.

In the third embodiment, using the waveguide substrate 81 and the fiber substrate 85 constructed in such a manner as described above, the waveguide 82 and the optical fiber 83 are connected to each other in accordance with the procedure described below with reference to FIGS. 64 to 70.

Figure 64:
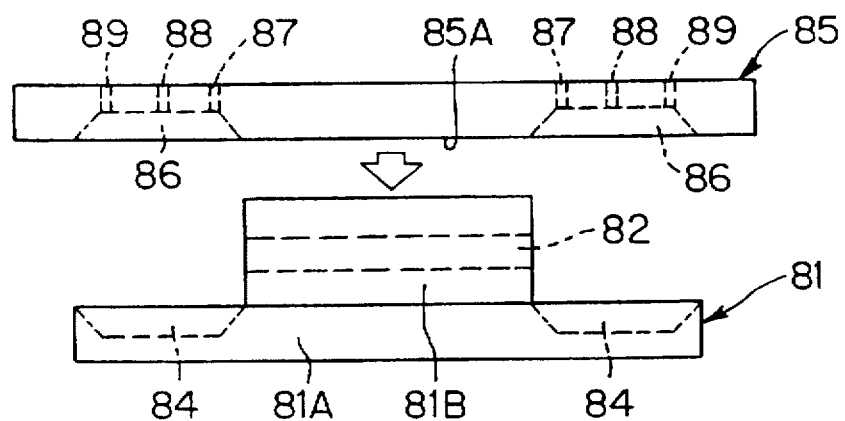
Figure 65:
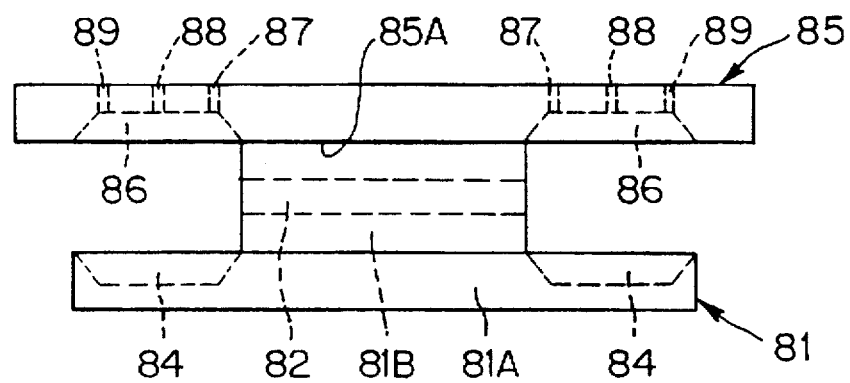

First, the fiber substrate 85 is placed onto an upper face of the $SiO_2$ layer 81B of the waveguide substrate 81 in such a manner that the second guide grooves 86 are opposed to the first guide grooves 84 of the waveguide substrate 81 (silicon substrate 81A), and then the fiber substrate 85 is applied and fixed to the waveguide substrate 81 (silicon substrate 81A) using a silicon anode joining apparatus as shown in FIGS. 64 and 65.

In this instance, the anode joining apparatus employs an infrared microscope and can observe through silicon, and accordingly, the joining is performed while patterns of the waveguide substrate 81 and the fiber substrate 85 are observed from the rear face side (upper face side in FIG. 65) of the fiber substrate 85 to effect positioning of them.

Here in the anode joining, when it is tried to join silicon (Si) members, a silicon member and a $SiO_2$ member or $SiO_2$ members to each other, a voltage is applied between two wafers (the waveguide substrate 81 and the fiber substrate 85) together with heat (for example, 400° to 500° C., 500 kV), whereupon the two wafers are joined to each other due to the force between atoms and the covalent bond.

After the waveguide substrate 81 and the fiber substrate 85 are joined to each other as shown in FIG. 65, the opposite ends of the waveguide substrate 81 and the fiber substrate 85 thus joined are cut to form end faces to form the waveguide substrate 81 and the fiber substrate 85 into a chip. When such cutting is performed, each of the third communication paths 89 which are formed in advance on the fiber substrate 85 and are located nearest to the opposite end portions function as a cutting guide. In particular, cutting is performed from the rear face side of the fiber substrate 85 while confirming the position of the third communication paths 89 so that V-shaped cross sections of the first guide groove 84 and the second guide groove 86 are exposed to the end faces of the waveguide substrate 81 and fiber substrate 85, respectively.

Figure 66:
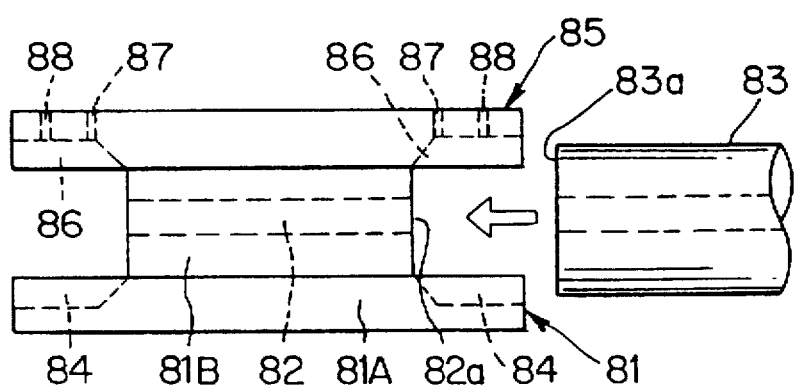

Then, the optical fiber 83 is inserted into a gap between the end portions of the waveguide substrate 81 and the fiber substrate 85, that is, between the silicon substrate 81A and the fiber substrate 85, along the first guide groove 84 and the second guide groove 86 as shown in FIGS. 66 and 67. In this manner, positioning of the optical fiber 83 with respect to the waveguide 82 is performed without any adjustment only by inserting the optical fiber 83 similarly as in the first embodiment.

After such insertion of the optical fiber 83, a thin bar 91 made of a metal or a resin material is inserted from the rear face side of the fiber substrate 85 through an associated one of the second communication paths 88 so that the optical fiber 83 is pushed downwardly into a fixed condition by the bar 91, and in this condition, a light setting resin 93 is injected into a space 92 between the end portion 82a of the waveguide 82 and the end portion 83a of the optical fiber 83 from the rear face side of the fiber substrate 85 through an associated one of the first communication paths 87.

For the light setting resin 93, for example, a UV (Ultra Violet) bonding agent which is hardened upon reception of ultraviolet rays and has a refraction index equal to that of the waveguide (core portion) 82 is employed. After the injection of the light setting resin 93, ultraviolet rays are introduced to the optical fiber 83 to harden the light setting resin 93 in the space 92 thereby to fix the optical fiber 83 to the waveguide 82 to optically couple the waveguide 82 and the optical fiber 83 to each other.

Figure 69:
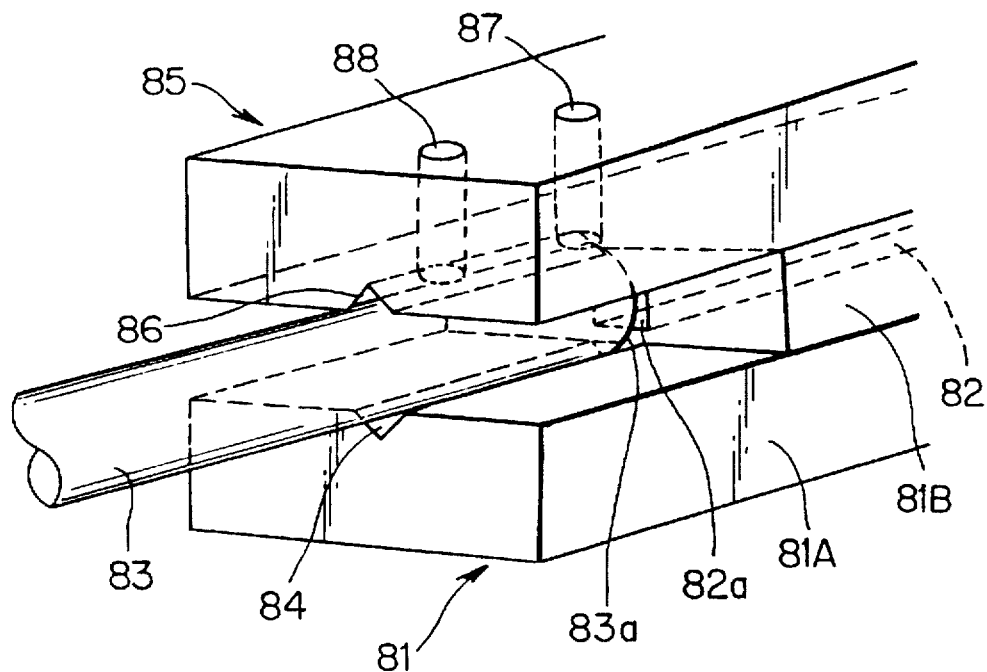
FIG. 69 is a perspective view illustrating a further different step of the procedure of connection between the waveguide and the optical fiber in the third embodiment.

Further, in order to raise the fixation strength of the optical fiber 83, a bonding agent, for example, a heat setting epoxy resin bonding agent (EPOTEC353ND (trade mark) or the like), is injected through the second communication path 88 in which the bar 91 is inserted as shown in FIG. 68. Consequently, the bonding agent is filled through the second guide groove 86 into a space defined by the outer periphery of the optical fiber 83, the silicon substrate 81A and the fiber substrate 85 so that the optical fiber 83 is fixed between the silicon substrate 81A and the fiber substrate 85 by the bonding agent, thereby forming such a connection structure as shown in FIG. 69.

Figure 70:
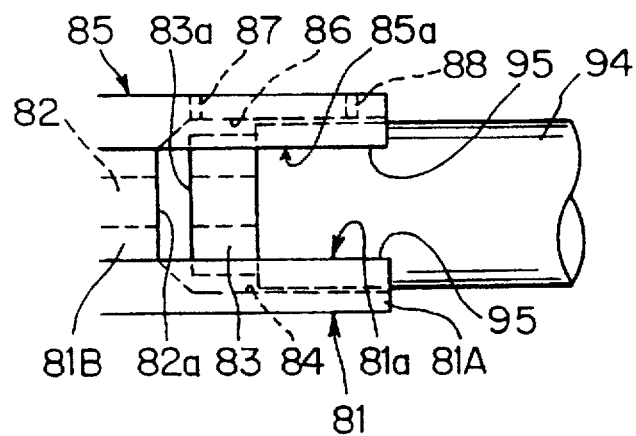
FIG. 70 is a side elevational view illustrating a modification to the waveguide-optical fiber connection procedure for the waveguide-optical fiber connection structure in the third embodiment.
Figure 71A:
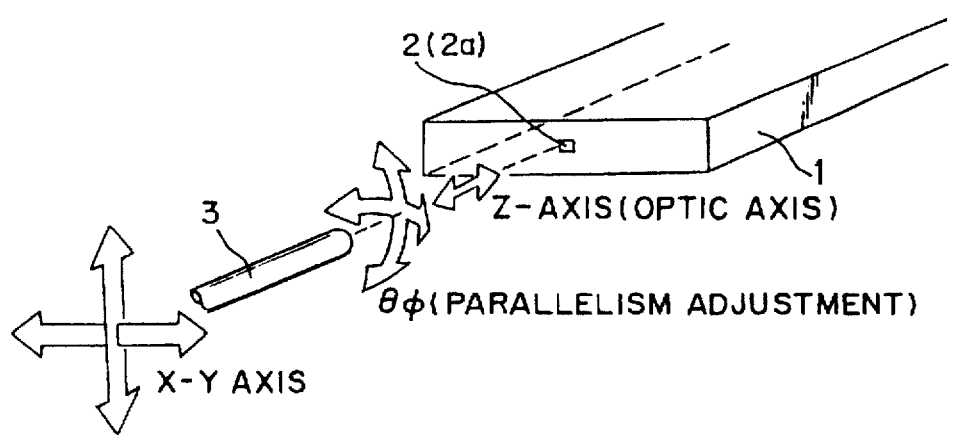
FIGS. 71(a) and 71(b) are perspective views showing a popular waveguide-optical fiber connection structure.
Figure 71B:
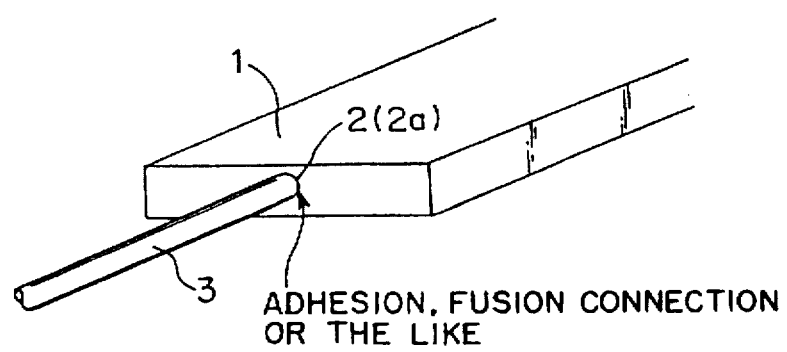
Figure 72A:
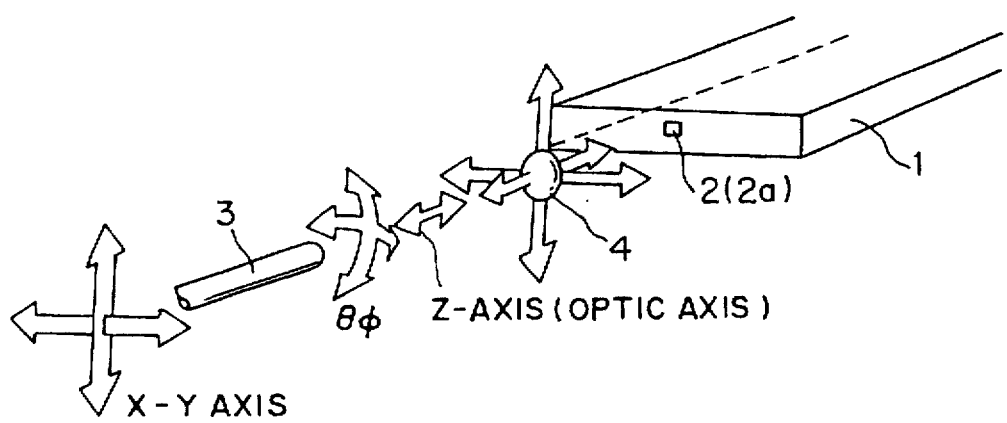
FIGS. 72(a) and 72(b) are perspective views showing another popular waveguide-optical fiber connection structure.
Figure 72B:
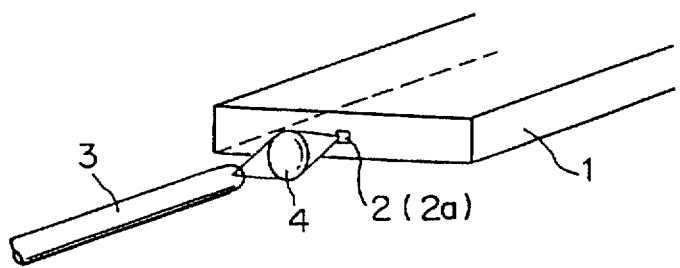

It is to be noted that, while, in the embodiment described above, the optical fiber 83 is fixed by means of an epoxy resin bonding agent, alternatively the optical fiber 83 may be fixed between the silicon substrate 81A and the fiber substrate 85 by soldering as seen in FIG. 70.

In this instance, however, soldering is performed before the light setting resin 93 (UV bonding agent) is injected.

Further, a metal film 94 (for example, a Ni/Au film wherein the film thickness of Ni is 2.5 µm and the film thickness of Au is 0.5 µm) is formed on an outer periphery of the clad adjacent the end of the optical fiber 83 in advance by plating, and another metal film (for example, a Cr/Ti/Au film wherein the film thickness of Cr is 1,000 angstrom, the film thickness of Ti is 2,000 angstrom and the film thickness of Au is 1,000 angstrom) is patterned, in advance before anode joining, on a surface portion 81a (including the inside of the first guide groove 84) of the silicon substrate 81A and a surface portion 85a (including the inside of the second guide groove 86) of the fiber substrate 85. The wettability for solder is enhanced by forming the metal films 94 and 95 on the optical fiber 83, the surface portion 81a of the silicon substrate 81A and the surface portion 85a of the fiber substrate 85 in this manner.

After the optical fiber 83 is inserted between the silicon substrate 81A and the fiber substrate 85 as shown in FIG. 69, the bar 91 is inserted from the rear face side of the fiber substrate 85 through the first communication path 87 so that the optical fiber 83 is pushed downwardly by the bar 91 to fix the optical fiber 83, and while the sub-assembly is heated to about 200° C., solder is injected from the rear face side of the fiber substrate 85 through the second communication path 88. The solder is thus filled, due to the wettability of the metal films 94 and 95, into the space defined by the outer periphery of the optical fiber 83, the silicon substrate 81A and the fiber substrate 85 so that the optical fiber 83 is fixed between the silicon substrate 81A and the fiber substrate 85 by means of the solder.

Then, after the solder become cool, a light setting resin 93 (UV bonding agent) is injected into the space 92 between the end portion 82a of the waveguide 82 and the end portion 83a of the optical fiber 83 from the rear face side of the fiber substrate 85 through the first communication path 87, and then ultraviolet rays are introduced to the light setting resin 93 to harden the light setting resin 93 in the space 92 to fix the optical fiber 83 to the waveguide 82 to optically couple the waveguide 82 and the optical fiber 83 to each other.

In this manner, according to the third embodiment of the present invention, since the position of the optical fiber 83 with respect to the waveguide 82 can be determined without any adjustment only by inserting the optical fiber 83 between the waveguide substrate 81 (silicon substrate 81A) and the fiber substrate 85 along the first guide groove 84 and the second guide groove 86, the number of man-hours is reduced to enhance the operability. Further, the end portion 82a of the waveguide 82 and the end portion 83a of the optical fiber 83 can be connected to each other readily with a high degree of accuracy and with a high degree of reliability with a simple construction such that an optical signal can be communicated at a low loss between them, and consequently, mass production and reduction in production cost of waveguide circuits can be realized.

Further, in the third embodiment, inclined faces 96 are formed, when the first guide groove 84 and the second guide groove 86 of a V-shaped cross section are formed by anisotropic etching, at end portions of the first guide grooves 84 and the second guide grooves 86 adjacent the waveguide 82 as shown in FIG. 67. Consequently, when the optical fiber 83 is inserted, it cannot be moved toward the waveguide 82 farther than the inclined faces 96, and consequently, the end portion 83a of the optical fiber 83 can be prevented from being abutted directly with the end portion 82a of the waveguide 82 and the end portion 83a of the optical fiber 83 and the end portion 82a of the waveguide 82 can be protected from damaging.

Further, in the third embodiment, since the waveguide substrate 81 ($SiO_2$ layer 81B) and the fiber substrate 85 are joined to each other by the force between atoms of Si and the covalent bond, tile waveguide substrate 81 and the fiber substrate 85 can be fixed very readily with a high strength.

The present invention is not limited to the specifically described embodiment, and variations and modifications may be made without departing from the scope of the present invention.

What is claimed is:

1. A waveguide-optical fiber connection method for connecting an end portion of an optical fiber to an end portion of a waveguide, comprising the steps of:
   preparing a waveguide substrate having a waveguide integrally formed thereon and having a first guide groove formed thereon adjacent to an end portion of said waveguide for positioning said optical fiber therein and a fiber substrate for holding said optical fiber thereon;
   fixing a face portion of said waveguide substrate and an opposing face portion of said fiber substrate to each other in a condition wherein said optical fiber fixed to said fiber substrate is held in close contact with said first guide groove on said waveguide substrate; and
   wherein said optical fiber having a metal coating applied to an outer periphery of a clad thereof in advance is fixed by metal fixation to said second guide groove of said fiber substrate at which said fiber substrate is coated with a metal film to hold said optical fiber on said fiber substrate, and in this condition, said waveguide and said optical fiber are connected to each other using said fiber substrate with said optical fiber.

2. A waveguide-optical fiber connection method as claimed in claim 1, wherein said waveguide and said optical fiber are connected to each other using said fiber substrate on which said optical fiber is held by fixing, by metal fixation, to said second guide groove of said fiber substrate said optical fiber having a metal coating applied only to an area of an outer periphery of a clad thereof necessary for metal fixation to said second guide groove while said optical fiber is mounted in said second guide groove.

3. A waveguide-optical fiber connection method as claimed in claim 1, wherein said optical fiber is mounted into said second guide groove of said fiber substrate on which a solder supply groove for flowing in therethrough solder to be used for metal fixation to said optical fiber is formed in a communicating relationship with said second guide groove, and solder is flowed in through said solder supply groove to fix said optical fiber to said fiber substrate by metal fixation, and then said waveguide and said optical fiber are connected to each other using said fiber substrate to which said optical fiber is fixed.

4. A waveguide-optical fiber connection method for connecting an end portion of an optical fiber to an end portion of a waveguide, comprising the steps of:
   preparing a waveguide substrate having a waveguide integrally formed thereon and having a first guide groove formed thereon adjacent to an end portion of said waveguide for positioning said optical fiber therein and a fiber substrate for holding said optical fiber thereon;
   fixing a face portion of said waveguide substrate and an opposing face portion of said fiber substrate to each other in a condition wherein said optical fiber fixed to said fiber substrate is held in close contact with said first guide groove on said waveguide substrate; and
   wherein each of a face portion of said fiber substrate and a face portion of said waveguide substrate which are opposed to each other when said optical fiber fixed to said fiber substrate by a first metal closely contacted with said first guide groove of said waveguide substrate has a second metal film formed thereon, and said first and second metal films are fixed to each other by metal fixation to connect said waveguide and said optical fiber to each other.

5. A waveguide-optical fiber connection method as claimed in claim 4, wherein a solder material used for the metal fixation between said fiber substrate and said waveguide substrate has a melting point set lower than the melting point of another solder material used for the metal fixation between said fiber substrate and said optical fiber.

6. A waveguicle-optical fiber connection method as claimed in claim 1, wherein said waveguide and said optical fiber are connected to each other using said waveguide substrate wherein a quartz waveguide and a first guide groove of a V-shaped cross section are formed on a silicon substrate and said fiber substrate wherein a second guide groove of a V-shaped cross section is formed on said silicon substrate and said optical fiber is held in said second guide groove.

7. A waveguide-optical fiber connection method as claimed in claim 1, wherein said fiber substrate which is first constructed as a portion of said waveguide substrate on which said second guide groove for fixation of an optical fiber is formed as an extension of said first guide groove simultaneously upon production of said waveguide substrate and is thereafter formed as a separate member from said waveguide substrate by being cut from said waveguide substrate and on which said optical fiber is held is prepared, and said waveguide and said optical fiber are connected to each other using said fiber substrate on which said optical fiber is held.

8. A waveguide substrate for use for waveguide-optical fiber connection, comprising a substrate having a waveguide integrally formed thereon and having a first guide groove formed adjacent an end portion of said waveguide thereon for positioning an optical fiber, said waveguide and said first guide groove being formed using a single mask member having patterns for formation of a waveguide and a guide groove.

9. A method of producing a waveguide substrate for use for waveguide-optical fiber connection, comprising the steps of:
   forming a low refraction index layer and a high refraction index layer on a silicon substrate;
   partially removing said high refraction index layer using a single mask member having patterns for formation of a waveguide and a guide way to form etching areas for a waveguide and a guide groove; and
   forming an upper low refraction index layer while the mask member on the opposite sides of the etching area for a guide groove is left as a fiber positioning etching mask, forming a guide groove and finally removing the etching mask.

10. A method of producing a waveguide substrate for use for waveguide-optical fiber connection as claimed in claim 9, wherein the step of forming an upper low refraction index layer on the etching mask includes the step of forming a thin film of a $SiO_2$ material between the upper low refraction index layer and the etching mask.

11. An optical fiber with a fiber substrate for use for.waveguide-optical fiber connection, comprising:
   an optical fiber having, at an end portion thereof, a metal coating provided on an outer periphery of a clad thereof; and
   a fiber substrate having a second guide groove for fixation of an optical fiber formed thereon and coated with a metal film;
   said end portion of said optical fiber being fixed by metal fixation to said second guide groove of said fiber substrate.

12. An optical fiber with a fiber substrate for use for waveguide-optical fiber connection as claimed in claim 11, wherein said end portion of said optical fiber at which said optical fiber is coated with the metal coating only in an area of the outer periphery of the clad thereof necessary for metal fixation of said optical fiber to said second guide groove of said fiber substrate is fixed by metal fixation to said second guide groove of said fiber substrate in a condition wherein it is mounted in said second guide groove of said fiber substrate to provide said fiber substrate at said end portion of said optical fiber.

13. An optical fiber with a fiber substrate for use for waveguide-optical fiber connection as claimed in claim 11, wherein said fiber substrate is provided at said end portion of said optical fiber by fixing said end portion of said optical fiber to said fiber substrate by metal fixation by mounting said end portion of said optical fiber in said second guide groove of said fiber substrate on which a solder supply groove for flowing in therethrough solder to be used for metal fixation to said end portion of said optical fiber is formed in a communicating relationship with said second guide groove and flowing solder in through said solder supply groove.

* * * * *

UNITED STATES PATENT AND TRADEMARK OFFICE
CERTIFICATE OF CORRECTION

PATENT NO. : 5,784,509
DATED : July 21, 1998
INVENTOR(S) : Takashi YAMANE, et al.

It is certified that error appears in the above-indentified patent and that said Letters Patent is hereby corrected as shown below:

On the title page, Item [75] the second inventor's name, delete "Yasuhiko OMORI" and insert --Yasuhiro OMORI--.

Signed and Sealed this

Thirty-first Day of August, 1999

Attest:

Q. TODD DICKINSON

*Attesting Officer*   Acting Commissioner of Patents and Trademarks

UNITED STATES PATENT AND TRADEMARK OFFICE
CERTIFICATE OF CORRECTION

PATENT NO. : 5,784,509
DATED : July 21, 1998
INVENTOR(S) : Takashi YAMANE, et al.

It is certified that error appears in the above-identified patent and that said Letters Patent is hereby corrected as shown below:

On the title page, Item [75] the second inventor's name, delete "Yasuhiko OMORI" and insert --Yasuhiro OMORI--.

Signed and Sealed this

Fourteenth Day of September, 1999

Attest:

Q. TODD DICKINSON

*Attesting Officer*    Acting Commissioner of Patents and Trademarks